United States Patent
Mahajan et al.

(10) Patent No.: US 9,369,445 B2
(45) Date of Patent: Jun. 14, 2016

(54) BIN ENABLED DATA OBJECT ENCRYPTION AND STORAGE APPARATUSES, METHODS AND SYSTEMS

(71) Applicant: MustBin Inc., Boston, MA (US)

(72) Inventors: Satyender Mahajan, Cambridge, MA (US); Michael R. Sollami, Cambridge, MA (US); Preston C. Shimer, Westborough, MA (US); Scott Prusinoski, Framingham, MA (US); Nathan A. Mackey, Natick, MA (US); Brian J. Shin, Newton, MA (US)

(73) Assignee: Mustbin Inc., Boston, MA (US)

( * ) Notice: Subject to any disclaimer, the term of this patent is extended or adjusted under 35 U.S.C. 154(b) by 33 days.

(21) Appl. No.: 14/536,799

(22) Filed: Nov. 10, 2014

(65) Prior Publication Data

US 2015/0134962 A1    May 14, 2015

Related U.S. Application Data

(60) Provisional application No. 61/902,113, filed on Nov. 8, 2013.

(51) Int. Cl.
*B25D 17/04*    (2006.01)
*H04L 29/06*    (2006.01)

(52) U.S. Cl.
CPC ........... *H04L 63/0428* (2013.01); *H04L 63/061* (2013.01); *H04L 2463/103* (2013.01)

(58) Field of Classification Search
USPC .......................................................... 713/171
See application file for complete search history.

(56) References Cited

U.S. PATENT DOCUMENTS

| | | | | |
|---|---|---|---|---|
| 7,216,238 B2 * | 5/2007 | Herrod | ................. | H04L 9/3236 713/168 |
| 8,112,809 B2 * | 2/2012 | Chou | ..................... | G06F 21/10 726/26 |
| 8,176,322 B2 * | 5/2012 | Lee | ......................... | G06F 21/10 380/201 |
| 8,271,783 B2 * | 9/2012 | Ibrahim | .................. | G06F 21/57 713/164 |
| 8,291,228 B2 * | 10/2012 | Laidlaw | ................. | H04L 63/08 726/7 |
| 8,417,967 B2 * | 4/2013 | Foster | .................... | G06F 21/78 380/277 |
| 8,566,610 B2 * | 10/2013 | Hazra | .................... | G06F 21/88 380/28 |
| 8,572,410 B1 * | 10/2013 | Tkacik | ................... | G06F 21/72 380/44 |
| 8,572,757 B1 * | 10/2013 | Stamos | .............. | G06F 21/6209 380/278 |
| 8,782,441 B1 * | 7/2014 | Osterwalder | ......... | G06F 21/602 713/193 |
| 8,997,192 B2 * | 3/2015 | Buer | ................... | H04L 63/0428 380/28 |
| 2011/0276656 A1 | 11/2011 | Knapp et al. | | |
| 2011/0289425 A1 | 11/2011 | Pletter et al. | | |
| 2012/0310826 A1 | 12/2012 | Chatterjee | | |
| 2013/0080765 A1 | 3/2013 | Mohanty et al. | | |
| 2013/0254115 A1 | 9/2013 | Pasa et al. | | |

OTHER PUBLICATIONS

International Search Report and Written Opinion, mailed Feb. 16, 2015 for PCT/US2014/064842, filed Nov. 10, 2014.

* cited by examiner

*Primary Examiner* — Amare F Tabor
(74) *Attorney, Agent, or Firm* — Cooley LLP

(57) ABSTRACT

The BIN ENABLED DATA OBJECT ENCRYPTION AND STORAGE APPARATUSES, METHODS AND SYSTEMS ("MBIN") transforms bin creation requests, bin templates and unencrypted object storage inputs, using MBIN components, into encrypted object storage bins and encrypted bin objects. A method comprises the creation of encrypted object storage bins, the storage of encrypted bin objects, and an application framework that allows privileged applications to leverage the capabilities of and data stored in the encrypted object storage bins.

27 Claims, 18 Drawing Sheets

Example: Mustbin Secure Storage

Example Data Flow: Mustbin Secure Storage Creation

Example Data Flow: Mustbin Secure Object Storage Device Login

Figure 5 — Example Logic Flow: Local Device Bin Storage Session Authentication and Session Artifact Generation, e.g., BDSES Component 500

Example Data Flow: Mustbin Bin Creation

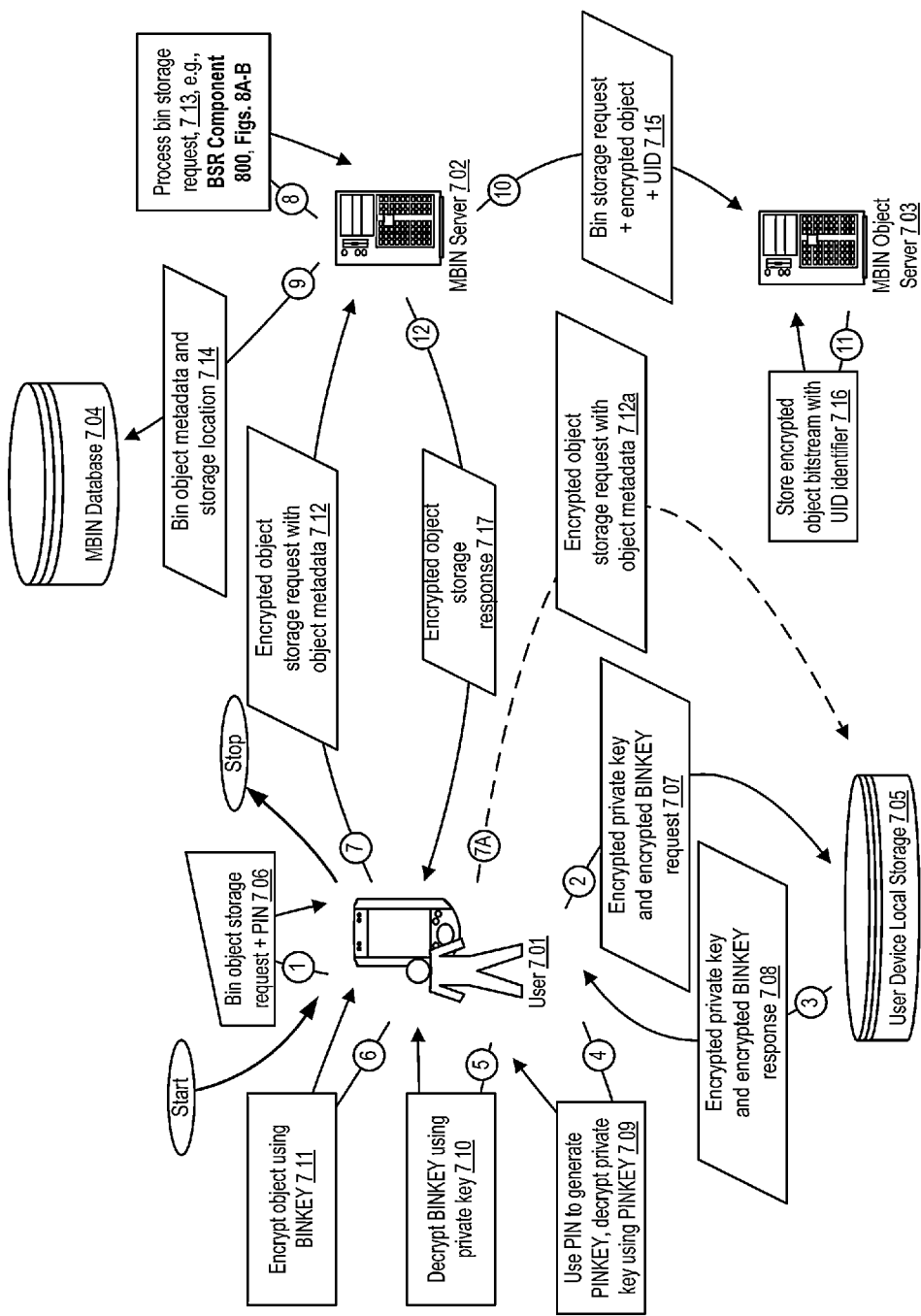
Figure 7 — Example Data Flow: Mustbin Bin Object Storage

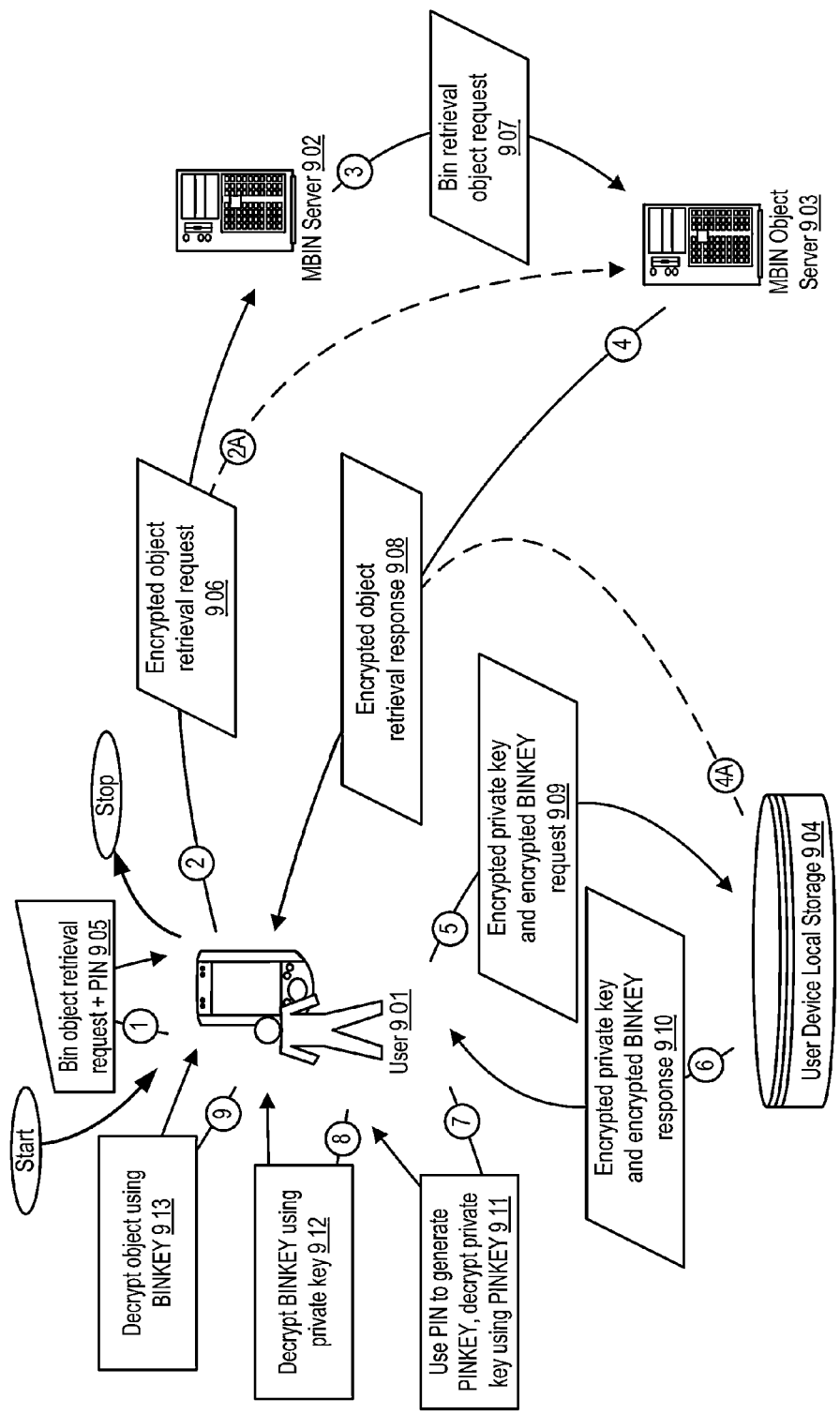
Figure 9 Example Data Flow: Mustbin Bin Object Retrieval

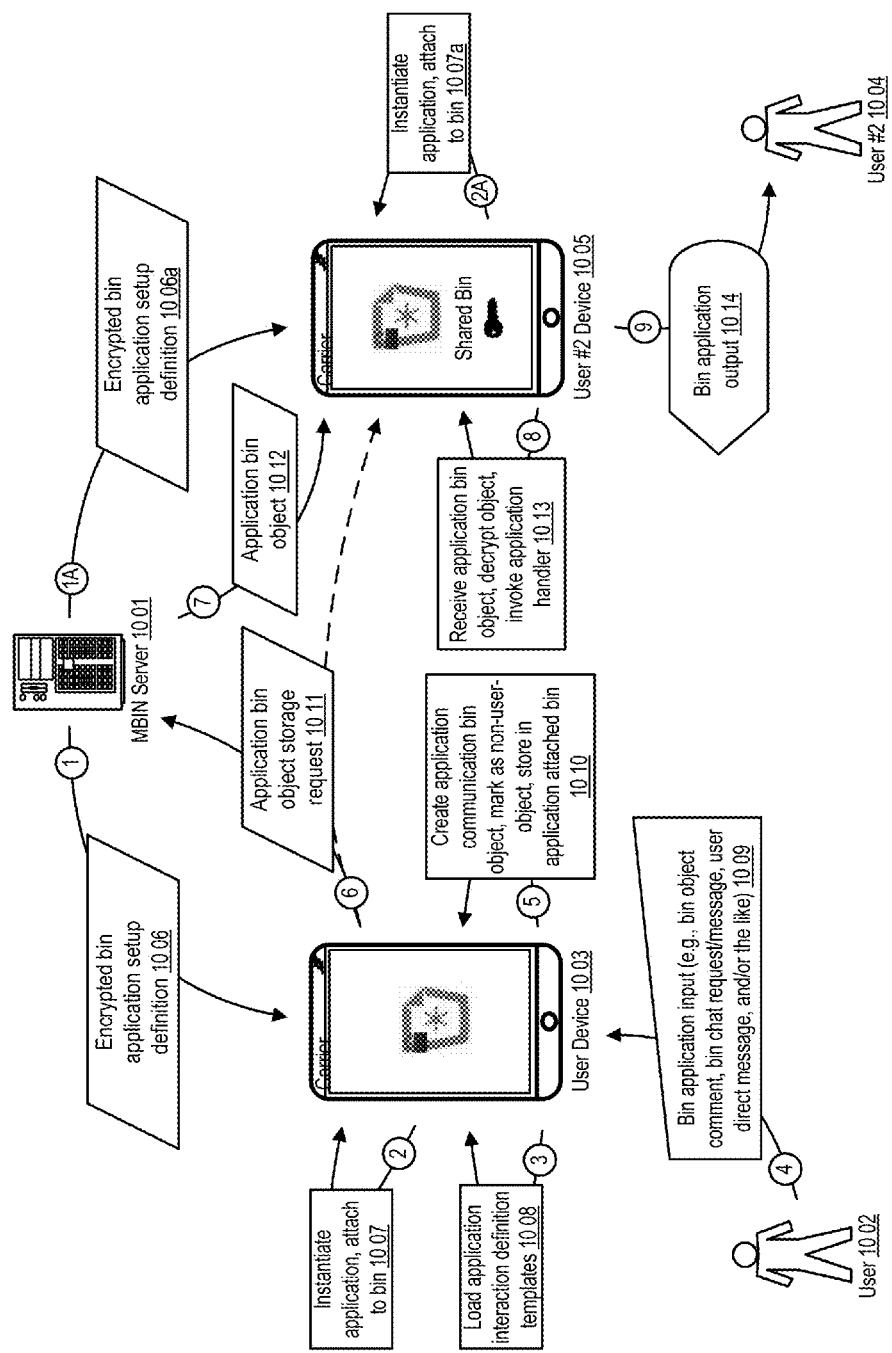
Figure 10 — Example Data Flow: Mustbin Bin Applications

Example: Visual Bin PIN Generation and Input

Example: Bin Data and Object Capture Workflow

Example: Bin Creation and Object Population Workflow

Example: Bin and Object Search Workflow

Example: Bin Object Population Workflow

BIN ENABLED DATA OBJECT ENCRYPTION AND STORAGE APPARATUSES, METHODS AND SYSTEMS

This application is a non-provisional of and claims priority under 35 USC §119 to: U.S. provisional patent application Ser. No. 61/902,113 filed Nov. 8, 2013, entitled "BIN ENABLED DATA OBJECT ENCRYPTION AND STORAGE APPARATUSES, METHODS AND SYSTEMS,".

The entire contents of the aforementioned application(s) are expressly incorporated by reference herein.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address the creation, storage, and usage of encrypted objects and object enabled applications. Some embodiments relate to the use of encrypted object storage containers and corresponding data structures in order to guide a user through the creation of encrypted bin objects.

BACKGROUND

Modern computing platforms generate data in a multitude of different file formats. Data files may contain audio, visual (such as photos, drawings, and/or the like), textual, or other types of information. Data files may contain or describe personal information that users desire to keep private. Users may access their files and may frequently update the file contents or create different versions of a file. Encryption may be used to convert an ordinary file into a secure file that can only be read by those possessing a "key."

BRIEF DESCRIPTION OF THE DRAWINGS

FIG. 7 shows an example data flow illustrating aspects of bin object storage, in one embodiment of the MBIN;

FIG. 9 shows an example data flow illustrating aspects of bin object retrieval, in one embodiment of the MBIN;

FIG. 10 shows an example data flow illustrating aspects of bin applications, in one embodiment of the MBIN;

The leading number of each reference number within the drawings indicates the figure in which that reference number is introduced and/or detailed. As such, a detailed discussion of reference number 101 would be found and/or introduced in FIG. 1. Reference number 201 is introduced in FIGS. 2A, 2B, etc.

DETAILED DESCRIPTION

The BIN ENABLED DATA OBJECT ENCRYPTION AND STORAGE APPARATUSES, METHODS AND SYSTEMS (hereinafter "MBIN" user interface) transform unencrypted objects into secure bin enabled objects, via MBIN components, in response to user bin object storage requests. In some embodiments, this is carried out in real time.

Figure 1:
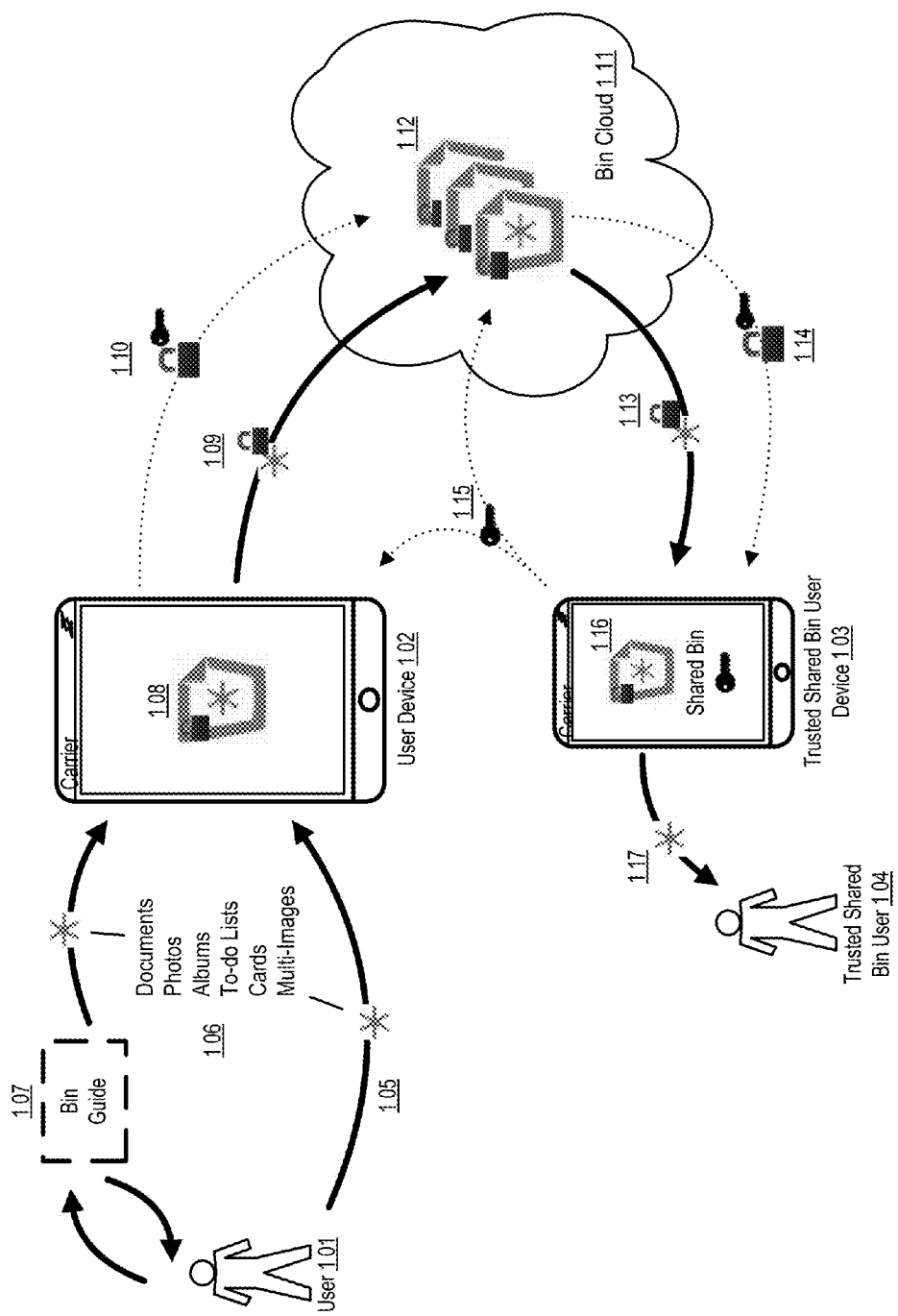
FIG. 1 shows a block diagram illustrating example aspects of MBIN enabled secure storage, in one embodiment of the MBIN.

FIG. 1 shows a block diagram illustrating example aspects of MBIN enabled secure storage, in one embodiment of the MBIN. In one embodiment, an MBIN user 101 may desire to store data objects in various forms and representing various types of media in a secure encrypted bin utilizing their user device 102. For example, an MBIN user may store documents, photos, collections of photos such as photo albums, to-do lists, cards containing textual or image-based data, multi-image collections of images that themselves form part of a larger document, and/or media or content in any form representable by a file. In some embodiments, the user may input either the content or the native data comprising any of the aforementioned files into a user device, e.g. 105. The user device may thereafter, either independently and/or in connection with a cloud-based service provider, e.g. bin cloud in, encrypt and securely store the user file and/or content input in a secure storage bin on the user device, e.g., 108.

In alternative embodiments, a bin guide 107, may be provided by the MBIN in order to facilitate the collection of various bin objects, such as documents photos and/or the like, that are connected with or associated with a given user task. For example, a bin guide 107 that is associated with a user wallet bin may contain guide instructions that will direct and/or facilitate the user's collection of data and the formation of bin objects from items typically in a user's wallet. An example wallet bin guide may prompt the user to photograph both sides of their license, collect important account numbers and/or customer service data, and/or the like. By allowing the aggregation of data and leveraging the user device's camera, the MBIN may enable a user to follow best practices in the collection of data connected with a certain activity, a certain location, and/or the like. Other example bin guides may provide instructions and/or functionality for aggregating data and creating bin objects associated with, for example, the items in the user's house, a user's car, financial statements associated with a user's account, items that a user has not yet purchased but which the user desires to acquire, individuals that the user has met and/or interacted with, and/or the like. In some embodiments, the MBIN may use bin guides that are provided by bin cloud 111, and/or developed by other users of the bin cloud. In so doing, user 101 may leverage knowledge regarding data acquisition best-practices as shared through a community of MBIN users.

In one embodiment, user device 102 encrypts the content and/or file generated by a user, e.g. 105, and stores the encrypted file on the local user device 102 in a manner such that the information is encrypted while at rest on the user device but may be still easily consumed and/or used by the user. In some embodiments, user device 102 may synchronize a bin object that has been encrypted with bin cloud 111, e.g. 109. The bin cloud 111 may contain multiple bins associated with an individual user of the cloud, and/or one or more bins associated with other MBIN users. In some embodiments of the MBIN a user may designate a bin as a shared bin and such a bin may thereafter be synchronized with other devices and/or users that are trusted by the primary user. For example, a trusted shared bin user 104 may utilize a user device 103 that has been configured to maintain a shared bin, e.g. 116. In one embodiment, the trusted shared bin user device 103 may create a public and private encryption key set and provide the public key to user device 102 and/or bin cloud 111, e.g. 115, for use in encrypting bin objects and/or the encryption keys associated with encrypted bin objects, that are to be synchronized with the trusted shared bin user device 103.

In one embodiment, user device 102 may, in addition to providing an encrypted bin object 109 to bin cloud in, additionally provide a symmetrical encryption/decryption key suitable for decrypting encrypted bin object 109. The symmetrical decryption key provided by user device 102 may be itself encrypted using the trusted shared bin user device provided public key 115, e.g. no. In so doing, the user device 102 may advantageously provide a single version of an encrypted object to bin cloud in for synchronization to a plurality of shared bin user devices, and provide one or more encrypted decryption keys that are each readable by at least one shared bin user device. In some embodiments, bin cloud 111 may thereafter synchronize the encrypted object 113 to shared bin 116. Additionally, bin cloud 111 may provide the necessary decryption key for encrypted object 113 but may provide the decryption key in a form that has been encrypted with public key 115, e.g. 114. In so doing, user device 102 and trusted shared bin user device 103 may synchronize bins, collections of bins, and/or objects stored in bins utilizing bin cloud in, while not providing access to bin objects to adversaries that may gain access to bin cloud in and/or that may be able to observe communication between the bin cloud and the various devices that are so connected to enable the bin and bin object synchronization.

In other embodiments of the MBIN, user device 102 may provide multiple versions of encrypted bin objects for synchronization. For example, in addition to encrypted bin object 109, a second encryption object representing the same underlying file contents may be generated by user device 102 using credentials provided by trusted shared bin user device 103 in order to encrypt the object for synchronization. In so doing, the MBIN may be configured such that each object stored in a shared bin is comprised of multiple encrypted versions each readable only by a single user and/or a single user device.

Furthermore, increased security may be achieved such as when an individual trusted shared user device has been compromised. In such a configuration, the MBIN may enable the rotation of future object encryption keys such that an adversary in possession of a trusted shared bin user device may not have access to future bin synchronized objects.

Figure 2:
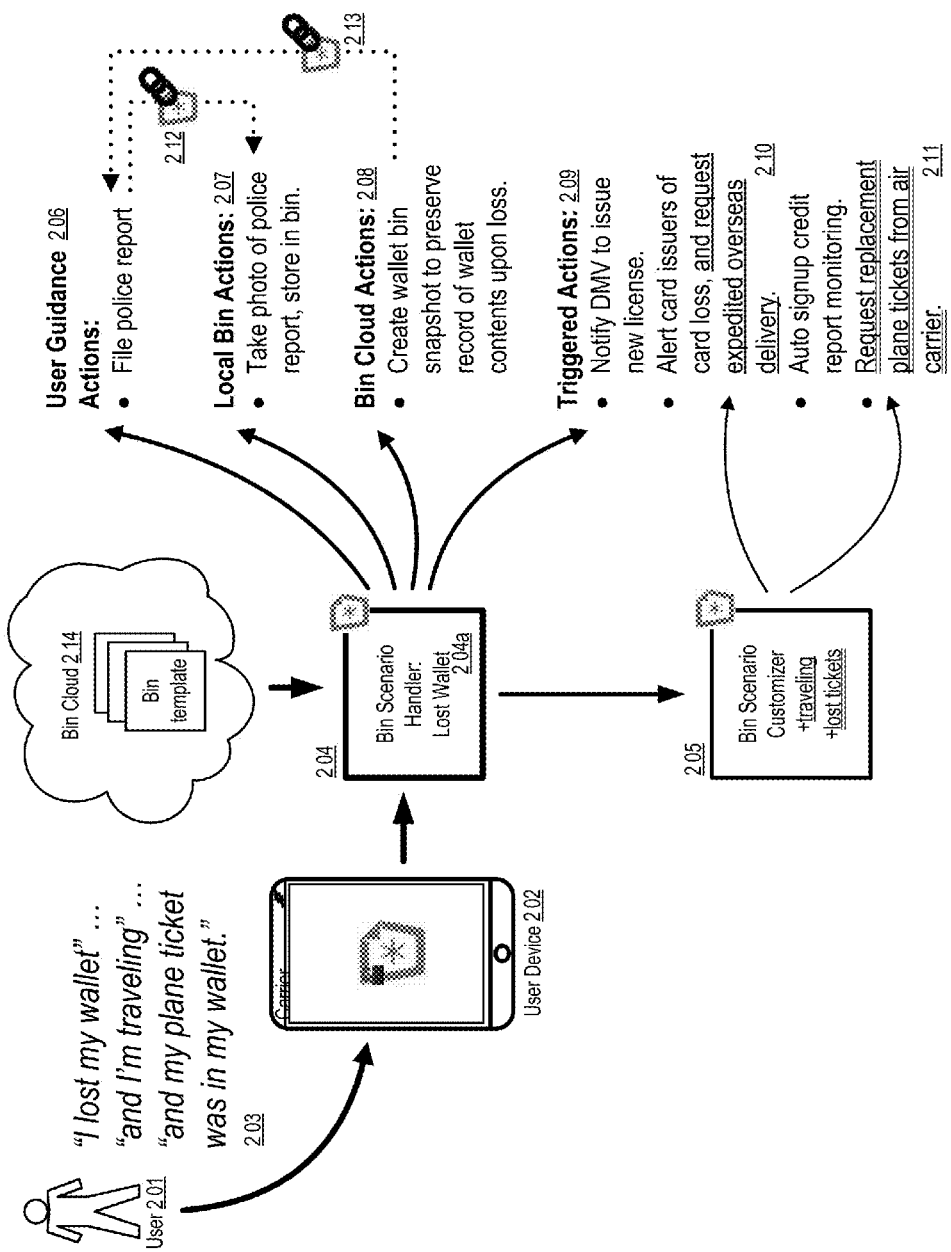
FIG. 2 shows a block diagram illustrating example aspects of a MBIN multifactor customizing scenario handler component, in one embodiment of the MBIN.

FIG. 2 shows a block diagram illustrating example aspects of a MBIN multifactor customizing scenario handler component, in one embodiment of the MBIN. In one embodiment, user 201 may initiate an MBIN scenario handler utilizing user device 202. A scenario may be one or more steps and/or manual, semiautomatic or automatic actions to be taken upon invocation of the scenario. For example, user 201 may invoke the scenario handler by providing an input configured to indicate that the user has lost their wallet, e.g. 203. Additionally, the user may indicate that they are traveling and that a plane ticket was located in their wallet that is now lost.

In one embodiment, bin cloud 214 may contain a plurality of bin scenario templates that may be queried dynamically or preloaded onto user device 202. In other embodiments, scenario templates may be provided by or contained within bin definition templates. The MBIN scenario handler 204 may parse the user input utilizing an integrated or third-party natural language parsing library to determine a primary scenario handler template 204a, such as a lost wallet handler template. Examples of natural language processing libraries suitable for this processing include Apache OpenNLP, Natural Language Toolkit (NLTK 2.0) and/or the like. In other embodiments, the user may provide scenario handler input by selecting one or more predefined scenarios from a list. Additionally, in further embodiments, the user may customize their scenario selection utilizing a predefined list of scenario customization capabilities that the scenario handler has been configured to customize based on. An example scenario handler template 204a, substantially in the form of an HTTP(S) POST message including XML-formatted data, is provided below:

```
POST /scenario_handler.php HTTP/1.1
Host: localhost
Content-Type: Application/XML
Content-Length: 667
<?XML version = "1.0" encoding = "UTF-8"?>
<scenario_handler_template>
    <timestamp>2025-12-12 15:22:43</timestamp>
    <message_credentials type="device_api_key">
        <auth_key>h767kwjiwnfe456#niimidrtsxbi</auth_key>
    </message_credentials>
    <scenario>
        <trigger>
            <or>
                <when type="user_input" val="launch_scenario" />
                <when type="receive_bin_app_msg" val="walletLost" />
            </or>
        </trigger>
        <actions type="user_guidance">
            <action id="12" name="police_report"
                type="todo"
                message="File police report"
                linked_action_id="17"
                link_type="delay_until_bin_snapshot_available" />
        </actions>
        <actions type="local_bin">
            <action id="15" name="photo_police_report"
                type="bin_object_slot"
                prompt_message="Photograph completed police report"
                linked_action_id="12"
                link_type="delay_until_complete" />
        </actions>
        <actions type="bin_cloud">
            <action id="17" name="snapshot_bin"
```

-continued

```
        type="bin_snapshot"
        param-bin_snapshot_id="lost_wallet_$DATE"
        param-bin_auto_share="true"
        param-bin_auto_share_delay="2hours"
        param-bin_auto_share_id="parse_ocr:police:12" />
    </actions>
    <actions type="triggered" delay="1hour">
      <action id="22" name="notify_dmv"
        type="notify-GET"
        description="Notify DMV"
        link="https://dmv.com/report/id=$BIN['wallet']
            ['license'] ['license_id']&
            state=$BINUSER['home_state']" />
      <action id="24" name="notify_issuers"
        type="invoke_api"
        api_definition="card_issuer.wsdl"
        update_wsdl="true"
        method_name="lostCard"
        method_param1=$BIN['wallet'] ['card1'] ['number'] />
    </actions>
    <actions>
      ...
    </actions>
    <scenario_customizers>
      <if sub_scenario="traveling:overseas">
        <action id="24" name="notify_issuers">
          <add method_param2="rush_expedited_delivery"/>
        </action>
      </if>
      <else>
        ...
      </else>
      ...
    </scenario_customizers>
  </scenario>
</scenario_handler_template>
```

The bin scenario handler template 204a may have multiple actions associated with the invocation of the scenario. By utilizing the encrypted bin object store that may be available on user device 202, and/or in a bin cloud in communication with the user device, the scenario handler may utilize not only information that is present on the local user device 202, but may leverage application programming interfaces available through the bin cloud, objects contained in shared bins, and/or the like. In one embodiment, the invocation of the bin scenario handler made provide user guidance actions, e.g. 206, local bin actions, e.g. 207, bin cloud actions, e.g. 208, triggered actions, e.g. 209, and/or the like.

In one embodiment, user guidance actions 206 may take the form of instructions to the user of actions to perform, bin objects to create, and/or other activities to initiate or engage in as a result of the scenario invocation. For example, in a lost wallet scenario, the user guidance action may instruct the user to file a police report and utilize the user device 202 integrated global positioning system antenna and an automated Internet search to provide the user with instructions and/or the location of the nearest police station at which to file the report. In one embodiment, local bin actions, e.g. 207, may include actions that either request or automatically collect information and store it in a local user device bin and/or synchronize the bin objects to a third-party, to the bin cloud, and/or the like. For example, in the lost wallet scenario described herein, a local bin action may instruct the user to point their user device camera at a completed police report and may automatically store and/or parse data contained in the police report for storage as MBIN encrypted object or objects in a local bin. In some embodiments, the cloud actions, e.g. 208, may include actions that are taken either automatically upon invocation of a bin scenario, or upon instruction of user 201. For example, a bin cloud action associated with a lost wallet scenario handler may create a snapshot of the user's wallet bin that has been previously synchronized to the bin cloud. In so doing, a record of the contents of the user's wallet at the time of loss may be provided by the MBIN and potentially utilized in establishing a loss record for user 201. In some embodiments, actions invoked by the bin scenario handler may be contingent upon one another, invoked only after the completion of one or more other actions, and/or dependent upon a bin scenario template or user defined custom logic. For example, bin cloud action 208 instructing the bin cloud to preserve a snapshot of the user's wallet bin, may invoke a linked action, e.g. 213, that automatically shares the contents of the bin snapshot with the police agency the user reports their lost wallet to. However, the user guidance action 206 to file a police report may itself be contingent upon, connected to and/or linked with, e.g. 212, a local bin action 207 such as the storage of a bin object containing a photo of the please report. In such a scenario, the bin handler may provide functionality to perform optical character recognition upon the photo of the please report in order to determine the appropriate agency the user filed the report with. An example library suitable for performing optical character recognition is Tesseract. As a result of that determination, the bin cloud action, e.g. 213, may thereafter be successfully invoked to share the wallet snapshot with the previously identified police agency. In such configurations, the MBIN scenario handler may therefore temporarily pause or suspend scenario actions while waiting for other actions within the scenario to complete or reach a determine state such that the relevant action can proceed.

In some embodiments, the bin scenario handler may invoke triggered actions, e.g. 209. Triggered actions may include actions that are external to the MBIN system yet are invoked by definitions present in a bin scenario handler template, e.g., 204a. For example, a triggered action may be associated with a lost wallet scenario handler, such that the Department of Motor Vehicles in the user's 201 home country may be notified immediately upon invocation of the lost wallet scenario handler. Similarly, card issuers such as credit card issuers may be notified that the user's payment cards have been lost. The information relevant to triggered actions 209 need not, in all embodiments, be specified in the definition of the triggered action. For example, a bin scenario handler for a lost wallet that utilizes encrypted bin objects representing card data may be configured to extract the customer service number from each encrypted object which may be a photo of the front and back of the user's payment card, and notify the issuer utilizing such information. In such a configuration, the triggered actions may be defined independent of the bin object contents yet be configured to utilize content that may be stored within bin objects at the time the scenario handler is ultimately invoked. Additionally, in some embodiments, upon scenario invocation one or more transactions may be engaged in by the bin scenario handler on behalf of the user. For example, a user who has recently lost their wallet may be automatically enrolled in a credit report monitoring service as a result of a bin scenario handler. In some embodiments, additional details provided to the bin scenario handler may be utilized to customize a base scenario. As such, bin scenario customizer 205 may utilize the additionally provided information that a user invoking a base handler such as the lost wallet scenario handler had additional characteristics associated with the invocation such as the user was traveling and the user lost a plane ticket in connection with their lost wallet. The scenario customizer may then utilize bin scenario handler definitions associated with other scenario templates and/or sub scenario templates associated with the primary bin scenario handler in order to customize the actions that are initiated by the base scenario handler. For example, the bin scenario customizer 205 may customize triggered action 209 that requests that card issuers be alerted of the user's card loss upon invocation of the base handler. The bin scenario customizer, with an awareness that the user is additionally traveling, may be configured to request that expedited overseas delivery, e.g. 210, be requested for delivery of replacement cards to the user while traveling. Furthermore, the bin scenario customizer may utilize the additional scenario invocation information that the user has lost their plane tickets to request a completely new triggered action configured to invoke an airline's lost plane ticket request application programming interface in order to proactively request that the user be issued replacement tickets, and/or be converted from a physical ticket to an electronic ticket, e.g. 211. By combining the capabilities of the bin scenario handler 204 and the bin scenario customizer 205 with the other MBIN capabilities described herein, such as the ability for a user to source bin scenarios from other users and/or from the bin cloud 214, complex scenario templates and bin scenario handlers may be provided to the user preconfigured with options relevant to either the majority of users or to users similarly situated as the current user. For example, the bin cloud may recommend a scenario handler with many scenario customizations relevant to international travel to a user who frequently stores bin objects in their travel information bin that indicates the user frequently travels outside their home country. Similarly, the bin cloud may alternatively provide bin scenario handlers that are simplified and/or require less user interaction, to users that infrequently travel.

Figure 3:
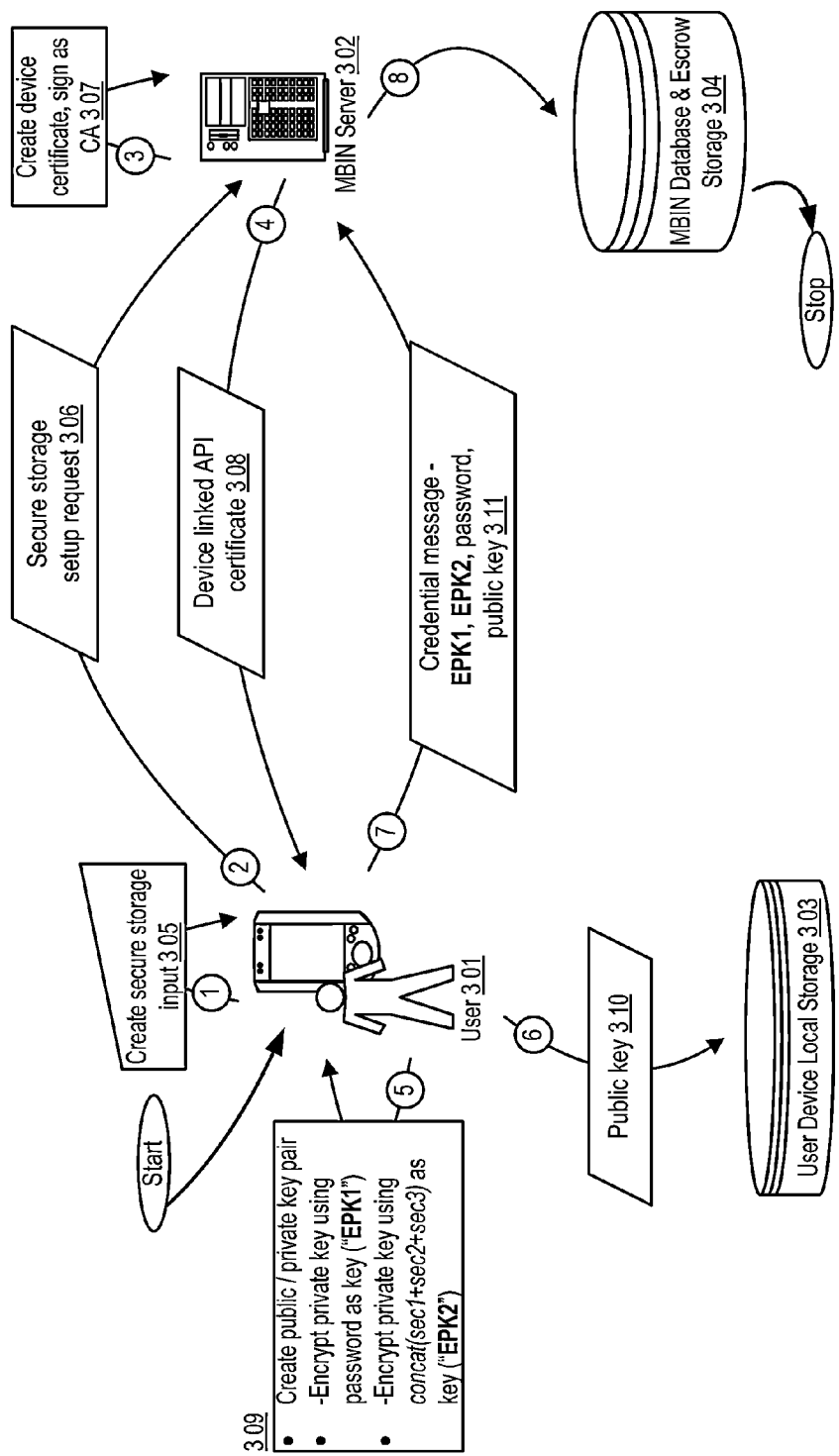
FIG. 3 shows an example data flow illustrating aspects of secure storage creation, in one embodiment of the MBIN.

FIG. 3 shows an example data flow illustrating aspects of secure storage creation, in one embodiment of the MBIN. User 301, in communication with a user device, may desire to establish a synchronized secure storage capability such that the user may thereafter create encrypted objects using their mobile device that are readily available for future reference by the user, synchronized to other devices and/or users that the current user approves, yet are not susceptible to decryption or viewing by the servers facilitating the bin object storage service or by unauthorized users and/or devices. In one embodiment, user 301 initiates a create secure storage input 305 on their user device. The input may be any of the tap, a double tap, an audio command, a gesture, a swipe, a user or user device motion pattern, and/or the like. An example create secure storage input 305 populated data structure, substantially in the form of an HTTP(S) POST message including XML-formatted data, is provided below:

```
POST /create_secure_storage HTTP/1.1
Host: localhost
Content-Type: Application/XML
Content-Length: 667
<?XML version ="1.0" encoding = "UTF-8"?>
<create_secure_storage>
    <timestamp>2025-12-12 15:22:43</timestamp>
    <device>
        <device_uid>EHGFYT65GFDCRTESDRXFRDEX</device_uid>
        <device_pkey>
            B3NzaC1yc2EAAAABIwAAAQEAyyA8wePstP
            C69PeuHFtOwyTecByonsHFAjHbVnZ+h0dp
            omvLZxUtbknNj3+c7MPYKqKBOx9gUKV/di
            R/mIDqsb405MlrI1kmNR9zbFGYAAwIH/Gx
        </device_pkey>
    </device>
    <storage>
        <password val="userchosenpassword" />
        <security_questions>
            <question num="1" id="q76765">
                <prompt val="Favorite color" />
                <user_answer val="blue" />
            </question>
            <question num="2" id="q942346">
                <prompt val="Favorite color" />
                <user_answer val="blue" />
            </question>
            <question num="3" id="q878753">
                <prompt val="Favorite color" />
                <user answer val="blue" />
            </question>
        </security_questions>
        <secure_storage_settings>
            <!-- allows local credentials to be encrypted using a PIN.
                if set to false, no local credentials stored -->
            <allow_PINkey_credential_storage val="true" />
            <!-- specify how much device space bin objects can use -->
            <bin_object_local_cache_size val="10GB" />
            <!-- decrypt and reencrypt objects in bin using a new
                key on this schedule -->
            <bin_key_rotation_frequency val="monthly" />
            <!-- use a different symmetrical key for every object
                stored in a bin (instead of one key for each bin) -->
            <unique_key_per_bin_object val="false" />
        </secure_storage_settings>
        <scenario_handler enabled="true">
            <auto_invoke>
                <condition type="if" value="phone_reported_lost:true" />
                <scenario type="custom">
                    <step num="1" type="local_bin_action">
                        <command val="delete_all_bins" />
                        <report to="binserver" val="bins_secured" />
                    </step>
                    <step num="2" type="local_bin_action">
                        <command val="remove_pinkey_secured_credentials" />
                        <report to="binserver" val="credentials_secured" />
                    </step>
                    <step num="3" type="bin_cloud_action">
                        <command val="deregister_device" />
                    </step>
                </scenario>
            </auto_invoke>
        </scenario_handler>
        <users_to_synchronize_storage_with>
            <user id="876876654" name="Jane"
                relation="wife" sync="all_bins" />
        </users_to_synchronize_storage_with>
        <devices_to_synchronize_storage_with>
            <device id="AEDFRW" name="My iPad" />
            <device id="7656532" name="My Work Phone" />
        </devices_to_synchronize_storage_with>
    </storage>
</create_secure_storage>
```

In one embodiment, the user device may transmit a secure storage set up request 306 containing information from create secure storage input 305 to MBIN server 302. The secure storage set up request may be generated natively by the user device or, in some embodiments, by an application the user has installed on their user device for purposes of facilitating secure bin object storage. MBIN server 302 may receive the secure storage set up request 306 and extract or determine a device identity. Thereafter, the MBIN server may create a device linked certificate that may be used to authenticate and secure future communication with the user device, e.g. 307. In one embodiment, the device linked certificate may facilitate device to MBIN server communication over Secure Sockets Layer (SSL). In some embodiments, the device certificate may be in the form of the cryptographic public key the may be used by the user device to encrypt future communications directed to MBIN server 302 and additionally may allow MBIN server 302 to verify that the user device associated with a future communications or API request is the same device that initiated the initial secure storage set up request. In some embodiments, MBIN server 302 may generate a device certificate and sign the certificate using a third-party certificate authority such that a chain of certification trust may be independently verified by the user device. In other embodiments, MBIN server 302 may act as its own certificate authority and therefore sign the created device certificate acting as its own certificate authority. In embodiments where the MBIN server 302 acts as its own certificate authority, the OpenSSL library may be used to generate a device linked certificate. For example, in acting as its own certificate authority MBIN server 302 may initially generate a signed root certificate. Example commands for generating a root certificate and signing the generated root certificate, substantially in the form of a series of bash shell commands is:

```
MBINSERVER$ openssl genrsa -out MBIN_CA_ROOT_KEY.key 2048
MBINSERVER$ openssl req -x509 -new -nodes -key
MBIN_CA_ROOT_KEY.key -days 9125 -out MBIN_CA_SIGNED_ROOT_KEY.pem
```

In order to generate a device linked API certificate, in some embodiments the user device may generate a private key and a certificate signing request. Example commands for generating a device private key and a certificate signing request, substantially in the form of a series of bash shell commands is:

```
USERDEVICE$ openssl genrsa -out USERDEVICE.key 2048
USERDEVICE$ openssl req -new -key USERDEVICE.key -out
USERDEVICE.csr
```

In some embodiments, the user device certificate signing request may be provided to MBIN server 302 as part of secure storage setup request 306. In some embodiments, MBIN server 302 may respond to the secure storage set up request 306 with a device linked API certificate 308. The device linked API certificate 308 may be linked to the user device such that another device in possession of the API certificate would not be able to impersonate the authenticated user device. Example commands for generating a device linked API certificate, substantially in the form of a series of bash shell commands is:

```
MBINSERVER$ openssl x509 -req -in USERDEVICE.csr -CA
MBIN_CA_SIGNED_ROOT_KEY.pem -Cakey MBIN_CA_ROOT_KEY.key -
CAcreateserial -out USERDEVICE_LINKED_API_CERTIFICATE.crt -days
9125
```

In one embodiment, upon receipt of the device linked API certificate 308, the user device may thereafter generate an asymmetrical encryption key pair, e.g. a public/private encryption key pair, for use in facilitating MBIN storage operations, e.g., 309. Example commands for generating a user device public/private key pair, substantially in the form of a series of bash shell commands is:

```
USERDEVICE$ openssl genrsa -out DEVICE_KEY.pem 2048
USERDEVICE$ openssl rsa -in DEVICE_KEY.pem -pubout >
DEVICE_PUBLIC_KEY.pub
```

The user device may thereafter encrypt the generated private key using a key derivation function and password provided by user 301 in connection with create secure store input 305. Additionally, the user device may encrypt the generated private key using, in one embodiment, a string representing a concatenation of one or more user security questions provided in connection with the create secure store input 305. For example, if user 301 indicated in connection with create secure storage input 305, that their favorite color was blue and their high school mascot was an eagle, the user's private key may be encrypted using a key generated from lowercase concatenation of the two answers, e.g., concat ("blueeagle"), and/or the like. In other embodiments, the user may provide answers to multiple security questions and/or security questions in addition to those required to generate the encrypted private key. In such embodiments, the MBIN may facilitate the creation of multiple versions of the user's encrypted private key that may be decrypted utilizing various combination of the user's security question answers. For example, if a user provided or was requested to provide answers to three security questions (such as answers X, Y and Z), their private key may be encrypted utilizing multiple permutations of two security question answers, e.g., X+Y, X+Z, Y+Z, and/or the like. In so doing, the user may later be able to decrypt their security answer encrypted private key using less than all of the answers to the security questions provided by the user. This feature may allow a user to successfully retrieve their private key from an encrypted private key when they have forgotten or otherwise lost some of the information comprising one or more of the security answers utilized in generating the encrypted private key. Example commands for generating private key encryption keys using a user's password input and security question answers in conjunction with a key derivation function, substantially in the form of Objective-C code is:

```
#import <CommonCrypto/CommonKeyDerivation.h>
//salt array is populated by, for example,
//SecRandomCopyBytes( ) before generation
NSData* salt = [self generateSalt256];
```

-continued

```
//user password
NSString* userPass = @"usersecretpassword";
NSData* userPassData =
    [userPass dataUsingEncoding:NSUTF8StringEncoding];
//user security questions
NSString* userSecQ = @"blueeagle";
NSData* userSecQData =
    [userSecQ dataUsingEncoding:NSUTF8StringEncoding];
//generate two keys
//one key using password
unsigned char keyPass[32];
CCKeyDerivationPBKDF(kCCPBKDF2,
    userPassData.bytes,
    userPassData.length,
    salt.bytes,
    salt.length,
    kCCPRFHmacAlgSHA256,
    2000,
```

```
     keyPass,
     32);
//one key using security question answers
unsigned char keySecQ[32];
CCKeyDerivationPBKDF(kCCPBKDF2,
     userSecQData.bytes,
     userSecQData.length,
     salt.bytes,
     salt.length,
     kCCPRFHmacAlgSHA256,
     2000,
     keySecQ,
     32);
```

The keys generated using the user's password and security question answers may thereafter, in one embodiment, by used to encrypt the user's private key. By encrypting the generated private key using information provided by and only known to user 301, the private key may be provided to one or more third parties such as MBIN server 302 while simultaneously not allowing said third parties access to the underlying private key such that they may decrypt objects encrypted using the generated public key. In so doing, the MBIN facilitates a mechanism by which one or more parties may encrypt data, e.g. using the generated public key, while simultaneously storing an encrypted copy of the private key corresponding to the used public key, and yet be unable to decrypt either the private key or the object encrypted using the public key.

In one embodiment, the user device may store the generated public key 310 in a local storage in communication with the user device, e.g. 303. In other embodiments, the encrypted private keys may additionally be stored on the user device local storage. In one embodiment, the user device may transmit the private key encrypted using the selected user password, the private key encrypted using one or more security answers or other data provided by user 301, a representation of the selected user password input, and the public key corresponding to the encrypted private key to MBIN server 302, e.g., 311. An example credential transfer message 311, substantially in the form of an HTTP(S) POST message including XML-formatted data, is provided below:

```
POST /credential_transfer.php HTTP/1.1
Host: www.MBINserver.com
Content-Type: Application/XML
Content-Length: 667
<?XML version = "1.0" encoding = "UTF-8"?>
<credential_message>
    <timestamp>2020-12-12 15:22:43</timestamp>
    <message_credentials type="device_api_key">
      <auth_key>h767kwjiwnfe456#niimidrtsxbi</auth_key>
    </message_credentials>
    <secure_storage_credentials>
      <private_key encrypted_using="password">
        lWXFCR+o3FXRitBqxiX1nKhXpHAZsMciLq8V6Rj
        sNAQwdsFvS1VK/7XAt3FaoJoAsncM1Q9x5+3V0W
        w68/eIF1zuUFljQJKprrX88XypNDvjYNby6vw/P
        b0rwert/En+AW4OZPnTPI89ZPmVMLuayrD2cE86
      </private_key>
      <private_key encrypted_using="securityAnswers">
        <key version="1" key="ans1+ans2">
          XbsLjKIBP/jaL2w92U72cUmKiXgVFaxP7LgRylF0
          UHjFoPfbbesYsfdHTgGnbmJDOui+RHGNiL16f62q
          0mPIZQxyq6SSyqILNiO3IlyrsCSXAerkrdxAAAAFQ
          D7wt2MuZU27cF4o0d6Ecm/jl7wAAAIEAvQvsiBcg
        </key>
        <keyversion="2" key="ans2+ans3">
          rzdT6xRLuqNzSGnGuq0ldg6JU+XyHTdNksOBDNz0
          PU2cCJBh+un9Bf1JrB5H6N9Kz2STJZSZdAAAAIBE
          G6g8HQEZhYcaDYNk/23FUBTQp++NVWHcSP6gLGH7
          KlGAHG+fbaRleH/1zjvFMTgnhB/0Y5XHEjE9jhFo
        </key>
        ...
      </private_key>
      <public_key>
        aC1yc2EAAAABIwAIEArkwv9X8eTVK4F7pMlSt4A
        5pWoiakFkZG9BjydOJPGH0RFNAy1QqIWBGWv7vS
        5K2tr+EEO+F8WL2Y/jK4ZkQgoi+n7DWQVOHsRij
        cS3LvtO+Np4yjXYWJKh29JL6GHcp8o7+YKyVUMB
      </public_key>
      <password preprocessing="hashed_by_user_device">
        E83CYDhK4AhabnltFE5ZbefwXW4FoKOO+n8AdDfSPas8
      </password>
    </secure_storage_credentials>
</credential_message>
```

In some embodiments, MBIN server 302 may utilize a database and/or escrow storage to store the multiple versions of the encrypted user private key, the user's public key, and/or the like for future use in MBIN operations.

In some embodiments, the key and credential transfer 311 may include a clear text, encrypted, and/or hashed version of the password selected by user 301 and used in one of the provided private key encryptions. In embodiments where the user password is provided unencrypted, MBIN server 302 may utilize a hashing function to generate a storable representation of the user password suitable for authenticating the user via a different bin access vector, such as a bin web portal, and/or the like. In embodiments where the user password provided, e.g. 311, has already been encrypted and/or hashed by the user device, MBIN server 302 may additionally encrypt and/or hash the password (e.g., encrypt a hash, hash a hash, encrypt a ciphertext, and/or the like). In so doing, adversaries that were able to intercept key and data transfer 311 may be prevented from asserting themselves as user 301 and/or the user device.

Figure 4:
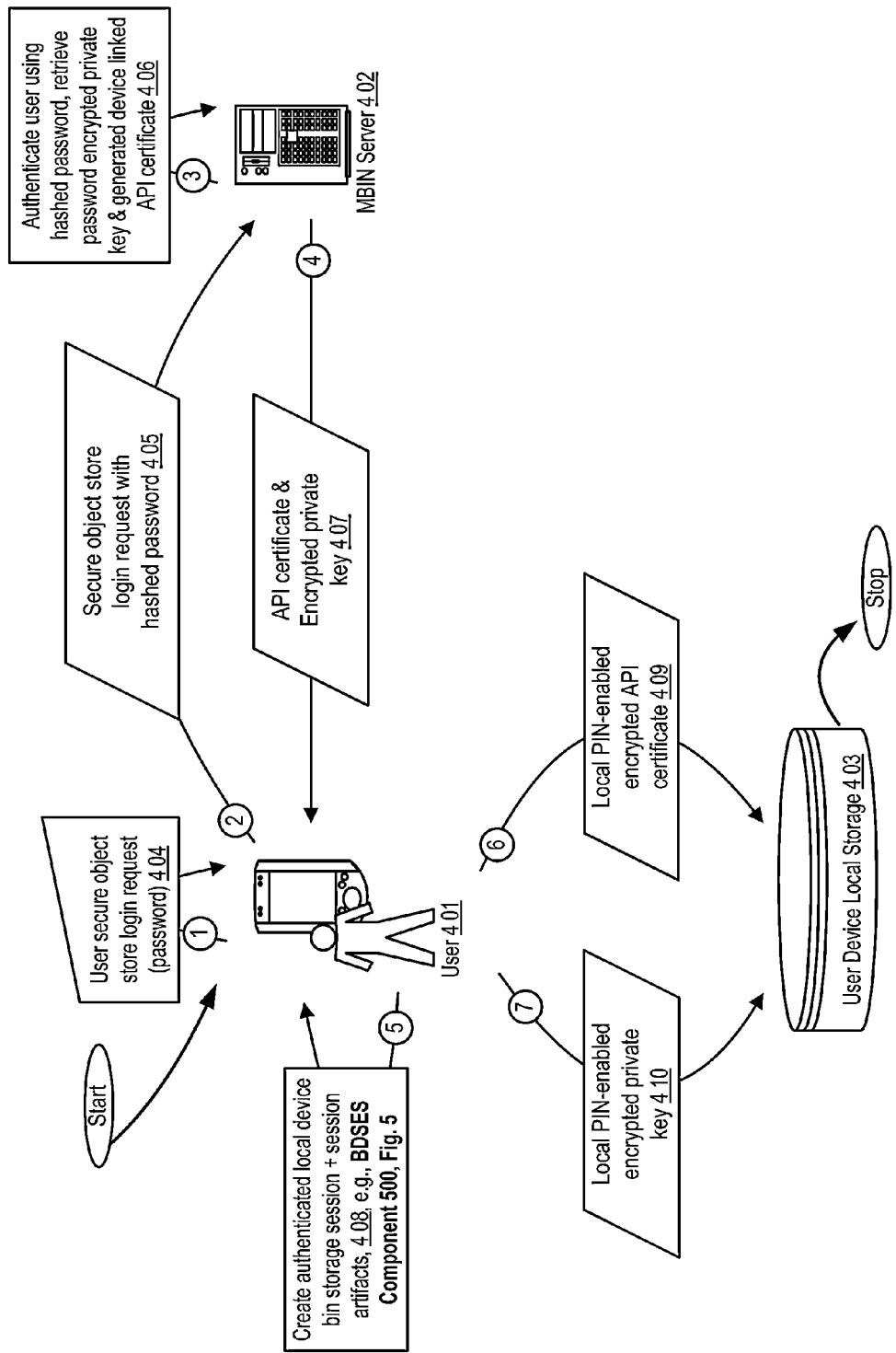
FIG. 4 shows an example data flow illustrating aspects of secure object storage device login, in one embodiment of the MBIN.

FIG. 4 shows an example data flow illustrating aspects of secure object storage device login, in one embodiment of the MBIN. In one embodiment, a user 401 that has created a secure object storage account may desire to login and/or access their secure object storage utilizing an approved device. Various configurations of the MBIN may clear encrypted objects and/or encrypted object access credentials from a user device after a given time quantum, upon user logout, and/or the like. As such, periodically, a user may be required by the MBIN administrator policies to login and/or reattach their device to their secure object storage account. In one embodiment, the user may provide a user secure object store login request including a password, e.g. 404. The user device may then transmit a secure object store login request containing a hashed version of the user's password to MBIN server 402, e.g. 405. In other embodiments, the user's password may be sent as clear text, as encrypted ciphertext, and/or the like. In an example embodiment, MBIN server 402 may thereafter authenticate the user utilizing the received hashed password. For example, if the MBIN password policy utilized for storing account passwords on MBIN server 402 is a hash of a hashed password, MBIN server 402 may then apply a secondary hash to the received hashed password and compare that value to a value stored in an MBIN server user table, such as that described with respect to FIG. 17.

In one embodiment, upon successful authentication of the user's account utilizing the hashed password, the MBIN server 402 may retrieve previously deposited encrypted private keys associated with the user which have been encrypted using the user's password, e.g., 406. Furthermore, a device linked API certificate may be retrieved. In other embodiments, the device linked API certificate may be regenerated based on a known device identifier or other device specific information such that each secure object storage device login request generates a unique device linked API certificate.

MBIN server 402 may then reply with a generated device linked API certificate and the encrypted private key for the user, e.g. 407. The user device may then create an authenticated local device bin storage session and/or create required session artifacts, e.g. 408, in order to instantiate the device's login to the secure object storage. Further detail with respect to creating an authenticated local device bin storage session may be found with respect to FIG. 5, e.g., BDSES component 500.

In one embodiment, the user device may store a local pin enabled encryption API certificate, e.g. 409, and a local pin enabled encrypted private key, e.g. 410, in a user device local storage 403. In so doing, the user may, in some embodiments, utilize their pin to quickly gain access to encrypted objects using their device without being required to undergo a full device authentication and/or login because the necessary credentials have been PIN secured on the user's device in connection with the secure object storage device session creation.

Figure 5:
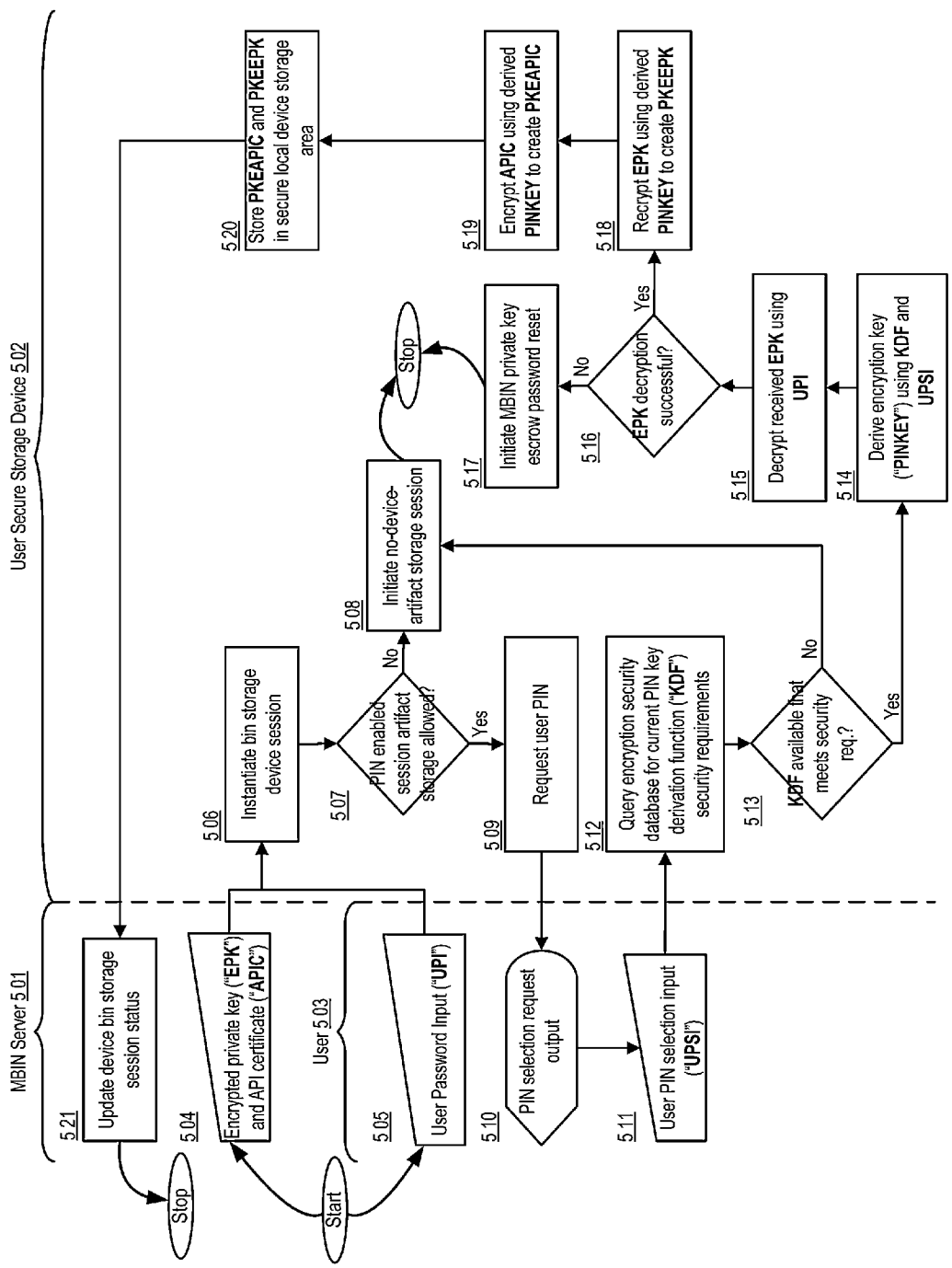
FIG. 5 shows an example logic flow illustrating aspects of local device bin storage session authentication and session artifact generation, e.g., an example BDSES Component 500, in one embodiment of the MBIN.

FIG. 5 shows an example logic flow illustrating aspects of local device bin storage session authentication and session artifact generation, e.g., an example BDSES Component 500, in one embodiment of the MBIN. In one embodiment, MBIN server 501 may transmit an encrypted private key and an API certificate to user storage device 502, e.g. 504. Additionally, user 503 may provide a user password as input to invoke the local device bin storage session authentication handler. The user secure storage device 502 may thereafter instantiate a storage device session and proceed to generate session artifacts utilizing the received inputs, e.g. 506. If PIN enabled session artifact storage is not allowed, e.g. 507, then the user secure storage device 502 may initiate a no-device-artifact storage session. In a no-device-artifact session scenario, the user secure storage device may not cache local artifacts that may be utilized to decrypt bin objects available to or on the local device. As such, the user secure storage device may instead utilize a communication link with MBIN server 501 to retrieve the necessary decryption credentials on an as-needed basis. In other embodiments, if PIN enabled session artifact storage is allowed, e.g. 507, the user secure storage device 502 may request the user to provide a PIN, e.g., 509. A PIN may be, for example, a series of digits provided as input by the user. In other embodiments, the PIN may be an alpha numeric string, a series of touch inputs, a user device gesture, and auditory sound, a retina eye scan, a photograph of an object known to the user, a photograph of the user, and/or the like. In one embodiment, the user device may display an output requesting the user 503 provide a PIN selection input, e.g. 510. The user may then input a PIN, e.g. 511.

A user PIN selection input, e.g. 511, may be utilized in connection with a cryptographic key derivation function in order to generate a key suitable for encrypting object access keys while at rest on the user secure storage device. Further detail regarding generating encryption keys using a PIN input may be found with respect to FIG. 3. In one embodiment, a storage device may query an encryption security database for the minimum requirements necessary for use of a key derivation function for pin enabled storage, e.g., 512. For example, the minimum requirement for a derivation function may require a minimum number of rounds during the generation of the encryption key from the PIN input. If a key derivation function is not available that meets the required security parameters, e.g. 513, the user secure storage device may then initiate a no-device-artifact storage session as described above. In so doing, even when PIN enabled storage is not allowed or not available to a user secure storage device, access to encrypted bin objects may be maintained through communication with MBIN server 501 and/or the like. In embodiments where a suitable key derivation function is available, e.g. 513, the derivation function may be executed on the user PIN selection input to derive a PIN enabled encryption key, e.g. 514.

In one embodiment, the user secure storage device 502 may then decrypt the received encrypted private key using the password input provided by user 503. If the received encrypted private key is not decryptable using the password input, the user may be prompted to reenter their password. In other embodiments, the user may provide answers to their account security questions established upon secure storage account creation. In still other embodiments, the user may initiate an MBIN server facilitated password reset, e.g. 517, either independently or in connection with the provision of their security question answers.

If the encrypted private key is successfully decrypted using the user password input, e.g. 516, the private key may be immediately recrypted using the PIN enabled encryption key generated earlier, e.g. 518. The user secure storage device 502 may furthermore encrypt the received API certificate using the derived PIN enabled encryption key, e.g. 519. The private key and the API certificate may, as a result, be locally encrypted on the user secure storage device using the generated PIN encryption key. In some embodiments, the user secure storage device 502 may store the PIN encrypted private key and the PIN encrypted API certificate in the local device's storage area, e.g. 520, such as on the local device application accessible memory storage. Upon successfully generating the session artifacts, the user's secure storage device may notify MBIN server 501 that the device bin storage session has been successfully authenticated, e.g. 521.

Figure 6:
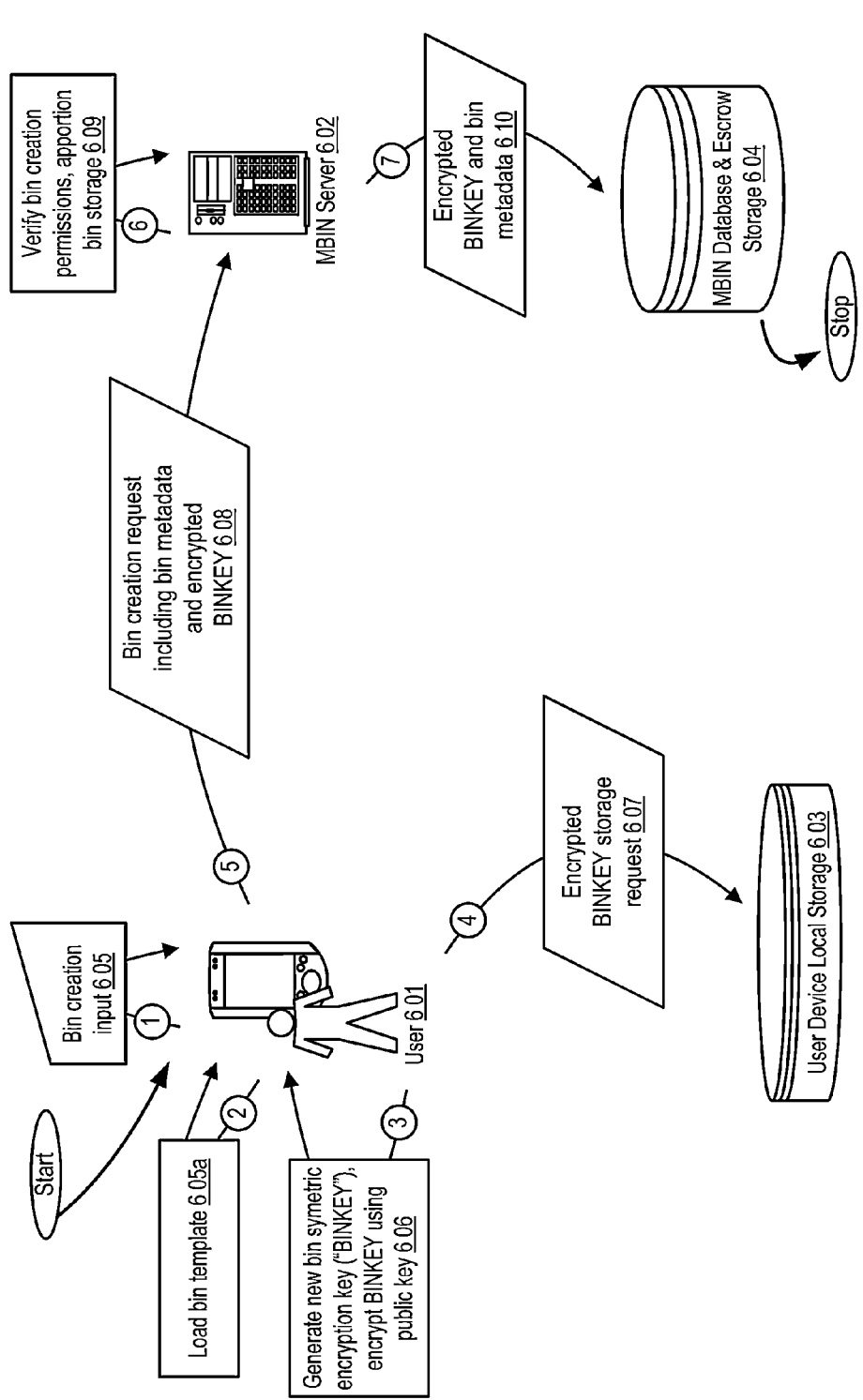
FIG. 6 shows an example data flow illustrating aspects of bin creation, in one embodiment of the MBIN.

FIG. 6 shows an example data flow illustrating aspects of bin creation, in one embodiment of the MBIN. In one embodiment, user 601 may desire to create a bin storage area within their enabled secure storage. A bin may be configured to hold one or more bin objects. Bin objects may be documents, photographs, audio files, personal user information, and/or any other data capable of being stored as a file. Bin objects may be encrypted and stored in a bin on a user device, synchronized to a bin synchronization cloud server, shared with other user devices, shared with other devices owned by other users the primary user has proved, and/or the like. Bins may be composed of sub-bins and each sub-bin may hold encrypted objects. Furthermore, bins may be defined using a bin creation template such that characteristics of a bin, such as the types of objects bin may hold, default storage preferences, synchronization preferences, replication preferences, and/or the like may be defined in a bin template and used during the creation or later modification of the bin. In some embodiments, a bin template may additionally define bin scenarios which may themselves be composed of one or more bin actions. Bin actions may include but are not limited to, local bin actions, remote bin actions, shared bin actions, bin cloud actions, third-party action such as API invocation instructions, and/or the like. Further detail with respect to bin actions may be found with respect to FIG. 2.

In one embodiment, user 601 may provide a bin creation input 605, specifying the parameters to be used in creating a bin. The user input may be in the form of a tap, a double tap, a swipe, a gesture, a QR code scan, a device motion, a device location indication including, in some embodiments, an automated location indication such as a user device GPS signal, and/or the like, e.g. 605. The user device may thereafter retrieve a bin template 605a corresponding to the bin creation input. An example bin template 605a, substantially in the form of an HTTP(S) POST message including XML-formatted data, is provided below:

```
POST /create_bin_from_bin_template.php HTTP/1.1
Host: localhost
Content-Type: Application/XML
Content-Length: 667
<?XML version = "1.0" encoding = "UTF-8"?>
<create_bin_ from_template>
    <timestamp>2025-12-12 15:22:43</timestamp>
    <message_credentials type="device_api_key">
        <auth_key>h767kwjiwnfe456#niimidrtsxbi</auth_key>
    </message_credentials>
    <bin_template id="8765" name="wallet" type="JSON"
        bin_object_redundancy_req="3-copies">
{
    "id": "com.mustbin.bin.wallet",
    "name": "Wallet",
    "desc": "Capture all of your cards and personal
            information in your wallet",
    "icon": "BinTypeWalletIcon.png",
    "SupportedDocTemplates": [
        "com.mustbin.doc.card.credit",
        "com.mustbin.doc.card.id",
        "com.mustbin.doc.card.business",
        "com.mustbin.doc.card.insurance",
        "com.mustbin.doc.card.rewards",
        "com.mustbin.doc.card.socialsecurity",
        "com.mustbin.doc.card.id.license",
        "com.mustbin.doc.multiImage.receipt",
        "com.mustbin.doc.multiImage.passport",
        "com.mustbin.doc.photo",
        "com.mustbin.doc.text.note"
    ],
    "SupportedActionTemplates": ["com.mustbin.action.lostwallet"],
    "GuideTitle": "Capture your wallet",
    "GuideDescription": "This will help you capture
            the most important items in your wallet.",
    "Steps": [
        {
            "StepType": "Intro",
            "DocTemplate": "com.mustbin.doc.card.credit",
            "Title": "Capture Your Wallet",
            "Subtitle": "A guide to help you capture the
                most important items in your wallet.",
            "DefaultImage": "WalletGuideIcon.png",
            "PreviousButtonHidden": "true",
            "CaptureButtonHidden": "true",
            "NextButtonHidden":"true",
            "HiddenInSummary": "true"
        },
        {
            "StepType": "Multiple",
            "DocTemplate": "com.mustbin.doc.card.credit",
            "Title": "Credit Cards",
            "Subtitle": "Tap the + button below to capture a card.",
            "CaptureButtonHidden": "false"
        },
        {
            "StepType": "Multiple",
            "DocTemplate": "com.mustbin.doc.card.insurance",
            "Title": "Insurance Cards",
            "Subtitle": "Tap the + button below to capture a card.",
            "CaptureButtonHidden": "false"
        },
        {
            ...
        }
    ]
}
    </bin_ template>
    <bin template id="8623" name="contacts" type="JSON">
        ...
    </bin>
    <bin template id="4633" name="house_contents" type="XML">
        ...
    </bin>
    ...
</create_bin_from_template>
```

In one embodiment, the user device may then generate an encryption key for use in encrypting bin objects for storage, e.g., 606. In one implementation, the bin key may be in the form of an AES-256 encryption key that can be used to block encrypt and decrypt bin objects. For example, the bin key may utilize a block cipher in converting an unencrypted bin file object into an encrypted bin file object. The user device may thereafter encrypt the generated bin encryption key utilizing the previously generated public key. In so doing, the MBIN may facilitate a capability such that a bin encryption key can only be decrypted with possession of the user's private key. Said differently, because bin objects may be encrypted utilizing a symmetrical bin key, and the symmetrical bin key is itself encrypted using the public key from a public-private key pair, an adversary would be required to obtain access to the user's private key in order to recover a bin's bin key and therefore be able to decrypt encrypted bin objects. In still further implementations, bins may contain encrypted bin objects where each bin object is encrypted using a different bin key, a per object key, and/or the like. In MBIN configurations where bin objects are synchronized to other devices, bins may be configured such that bin objects are encrypted multiple times using different credentials such that the bin key used to encrypt a bin object on a given user device will not decrypt that same object in the form synchronized to another device. In one embodiment, the user device may store the encrypted bin key on a user device local storage 603, e.g. 607.

In one embodiment, the user device may generate a bin creation request including bin metadata and the encrypted bin key and transmit the request to MBIN server 602, e.g. 608. An example bin creation request 608, substantially in the form of an HTTP(S) POST message including XML-formatted data, is provided below:

```
POST /do_create_bin.php HTTP/1.1
Host: www.MBINserver.com
Content-Type: Application/XML
Content-Length: 667
<?XML version = "1.0" encoding = "UTF-8"?>
<bin_ creation_request>
    <timestamp>2025-12-12 15:22:43</timestamp>
    <message_credentials type="device_api_key">
        <auth_key>h767kwjiwnfe456#niimidrtsxbi</auth_key>
    </message_credentials>
    <bin id="1">
        <bin_keys>
            <key type="encrypted_binkey" pubKey="user:self">
                uysLjKiuhiuh2w92U72cUmKiXgVFaxP7LgRylF0
                87jFoPfbbesYsfdHTgGnbmJDOui+RHGNiLl6f62q
                cfPIZQxyq6SSyqLNiO3IlyrsCSXAerkrgfd4rAFQ
            </key>
            <key type="encrypted_binkey" pubKey="shared:user[7657]">
                ...
            </key>
            <key type="encrypted_binkey" pubKey="shared:device[3232]">
                ...
            </key>
        </bin_keys>
        <bin_definition base_bin_template="wallet">
            <alter key="bin_object_redundancy_req" value="4-copies">
            <add type="template item"
                format="JSON"
                after_location="Root:Steps:Title['Insurance Cards']">
                {
                    "StepType": "Multiple",
                    "DocTemplate":"com.mustbin.doc.card.rewards",
                    "Title": "Rewards Cards",
                    "Subtitle": "Tap the + button below to
                        capture a card.",
                    "CaptureButtonHidden": "false"
                }
            </add>
        </bin_definition>
    </bin>
    <bin>
        ...
```

-continued

```
    </bin>
</bin_creation_request>
```

The MBIN server may thereafter verify that the user and/or user device has permission to create the requested bin and apportion or allocate storage necessary for the bin and/or bin objects, e.g. 609. MBIN server 602 may then store the encrypted bin key and the bin metadata 610 in an MBIN database and/or escrow storage 604.

FIG. 7 shows an example data flow illustrating aspects of bin object storage, in one embodiment of the MBIN. In one embodiment, user 701 may provide a bin object storage request, e.g. 706. In MBIN configurations that allow PIN enabled storage, the bin object storage request may additionally include a PIN. The user device may receive the bin object storage request including information and/or a file to be stored as an encrypted bin object.

In one embodiment, the user device may request from a user local storage 705 an encrypted private key and encrypted bin key, e.g. 707. If available, the local storage may return an encrypted private key and an encrypted bin key for use in encrypting the object to be stored in a bin, e.g. 708. The user device may thereafter utilize the provided PIN in a key derivation function to generate a decryption key from the provided PIN and thereafter utilize the generated PIN key to decrypt the received encrypted private key, e.g. 709. Further detail with respect to PIN key generation using a PIN input may be found herein and particularly with respect to FIG. 3. Upon obtaining access to the decrypted private key, the user device may then utilize the private key to decrypt the encrypted bin key, e.g. 710. The user device may thereafter utilize the decrypted bin key, which in some embodiments is a symmetrical encryption key, for use in encrypting the provided object for bin storage, e.g. 711. An example library suitable for encrypting a bin object using a bin key is Apple's Common Crypto, e.g., CC_crypto( ) library.

In some embodiments, the encrypted bin object may thereafter be stored in the user's local device storage until access to MBIN server 702 may be established. In some MBIN configurations, access to the MBIN server 702 may be time-limited, data rate throttled, and/or otherwise configured to optimize MBIN performance. The user device may provide the encrypted object as part of an encrypted object storage request, e.g. 712. An example encrypted object storage request 712, substantially in the form of an HTTP(S) POST message including XML-formatted data, is provided below:

```
POST /object storage.php HTTP/1.1
Host: www.MBINserver.com
Content-Type: Application/XML
Content-Length: 667
<?XML version = "1.0" encoding = "UTF-8"?>
<encrypted_object_storage_request>
    <timestamp>2025-12-12 15:22:43</timestamp>
    <message_credentials type="device_api_key">
        <auth_key>h767kwjiwnfe456#niimidrtsxbi</auth_key>
    </message_credentials>
    <object id="16545623" num="1" count="2">
        <bin_destination_id value="654323" />
        <object_encryption_parameters>
            <bin_key id="765654" />
            <encryption type="AES256" />
            <private_key user_id="654" />
        </object_encryption_parameters>
        <object_metadata>
            <type val="image" />
            <format val="PNG" />
            <user_description val="My license front" />
        </object_metadata>
        <object_content type="contentstream">
            ‰PNGbw•˘SUDsˇ`{ÀžØ©ääÇ f§ 9±õPôHôHÅ+buq
            ó8»'¶‡Øôc Æ †X}'"•1Žÿ°"åOl‰ıÏË<Ø"pŽ¦<÷»
            6cÁíàØ² Ð DôiRlíù=æÿï Œ - ¨ûùØx¨=Î[Ûr"5sj
            îäs©õúØ"ÖìD`ØÖ Á±è Ç ûxt6w¦s¼ÒÒYD'á6⁻³d
        </object_content>
    </object>
    <object id="87654344" num="2" count="2">
        ...
    </object>
</encrypted_object_storage_request>
```

In some embodiments, as part of the bin object storage request 706, user 701 may provide additional metadata that describes the bin object and which may not be encrypted. In such an MBIN configuration, limited metadata regarding bin encrypted objects may be obtained even in the absence of the appropriate bin object decryption credentials. MBIN server 702 may then process the bin storage request, e.g. 713. Further detail with respect to processing bin storage requests may be found with respect to FIGS. 8A-B, e.g. BSR component 800.

In one embodiment, MBIN server 702 may store bin object metadata and the storage location of the encrypted bin object determined during processing of the bin storage request in MBIN database 704, e.g. 714. Furthermore, MBIN server 702 may provide a bin storage request including the encrypted bin object and an identifier with which the object is to be associated, e.g. 715, to MBIN object server 703. In some MBIN configurations, multiple MBIN object servers may be utilized to replicate the encrypted bin object. In one embodiment, MBIN object server 703 will store the encrypted object including the unique object identifier, e.g. 716.

Figure 8A:
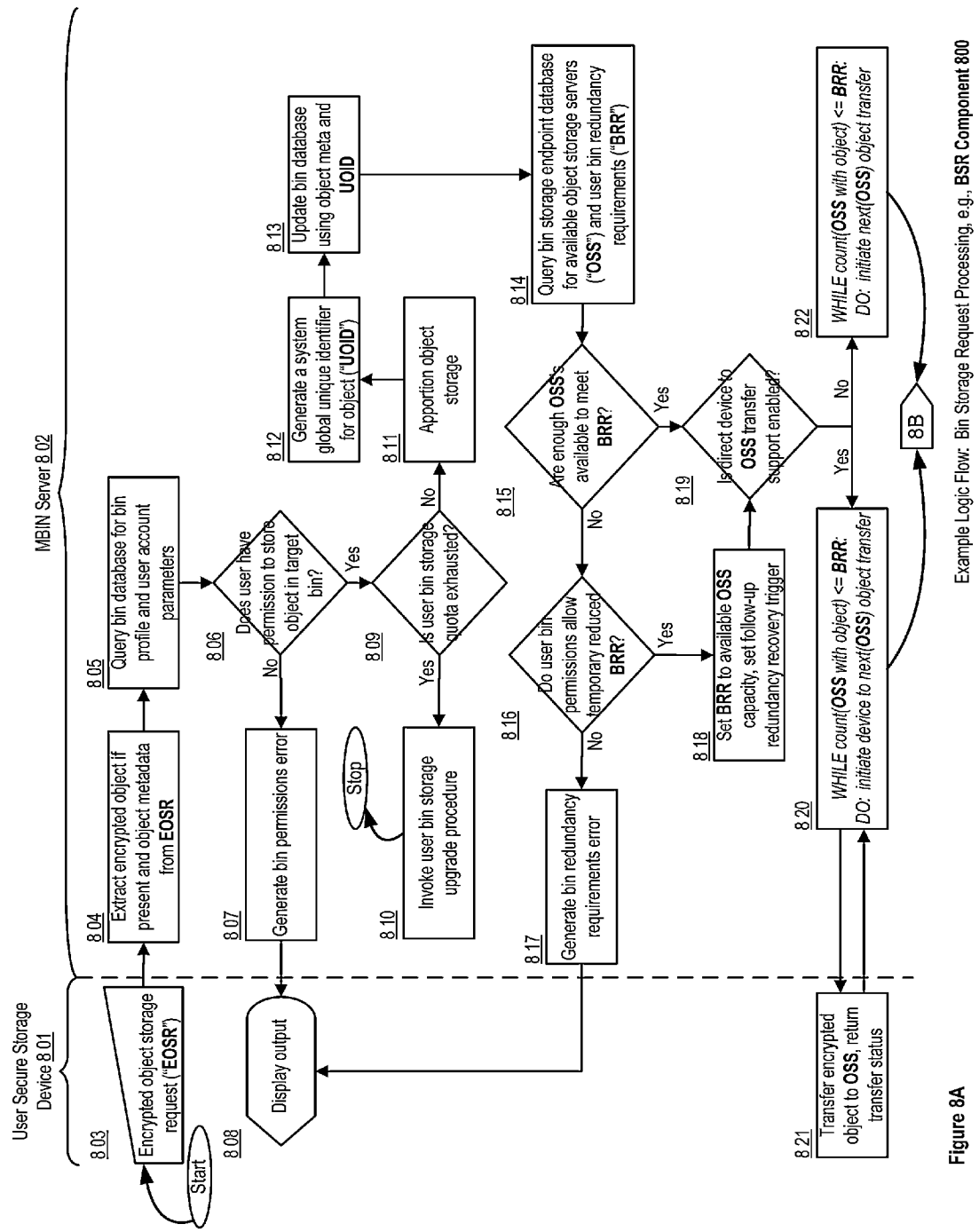
FIGS. 8A-B show an example logic flow illustrating aspects of bin storage request processing, e.g., an example BSR Component 800, in one embodiment of the MBIN.
Figure 8B:
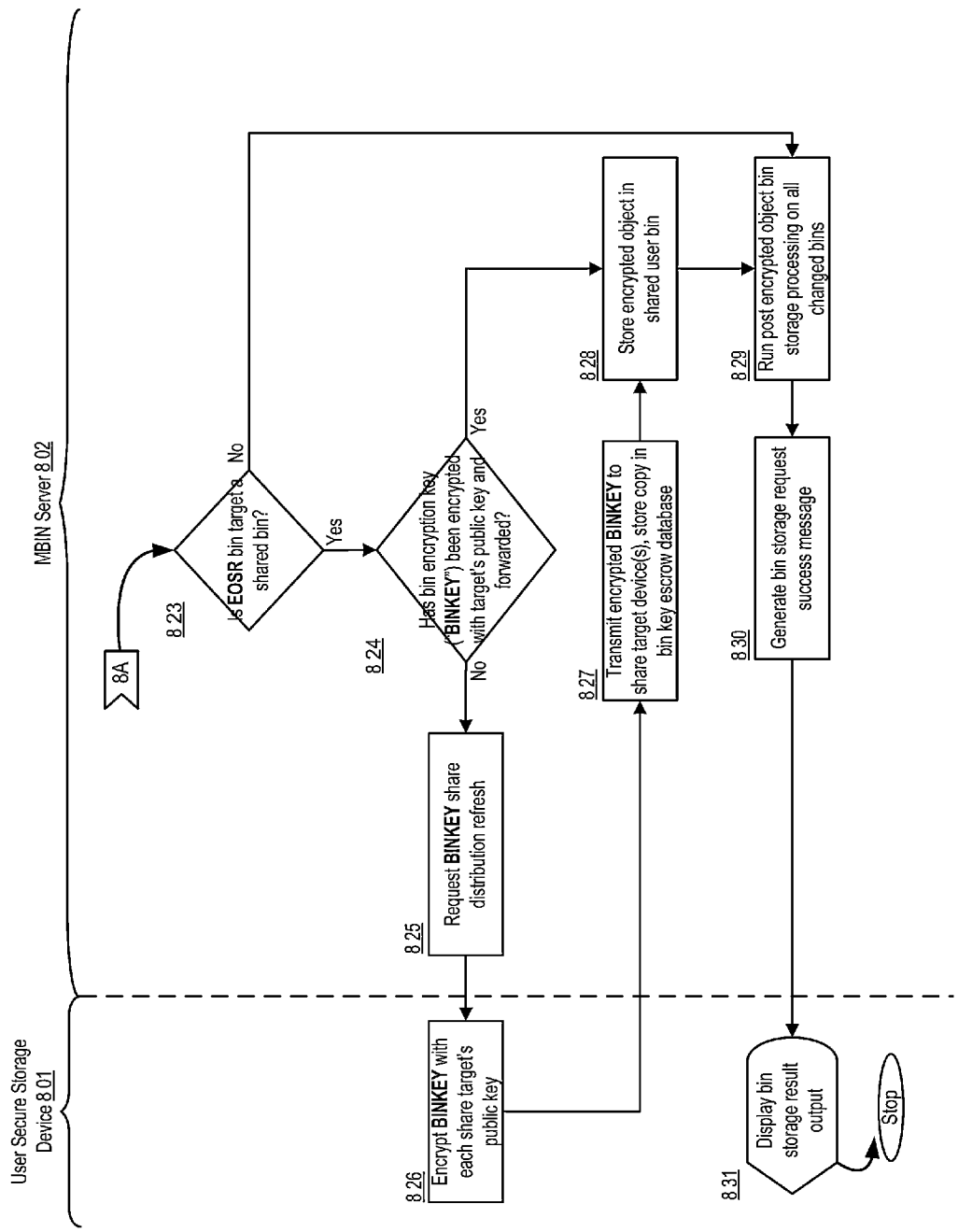

FIGS. 8A-B show an example logic flow illustrating aspects of bin storage request processing, e.g., an example BSR Component 800, in one embodiment of the MBIN. In one embodiment, user secure storage device 801 may provide an encrypted object storage request, e.g. 803, to MBIN server 802. The MBIN server may receive the storage request and extract one or more encrypted objects if present and any associated object metadata, e.g. 804. In one embodiment, the MBIN server may query a bin database such as that described with respect to FIG. 17 for a bin profile and user account parameters, e.g. 805. A bin profile may define the types of objects that may be stored in a bin, the storage space allocated to the bin, a number of objects that may be stored simultaneously by a given user or device, operations to run on objects prior to storage in a bin, users or applications to notify upon bin object storage, and/or the like. If the requesting user or the requesting user device does not have permission to store an object in the requested target bin, e.g. 809, the MBIN server may generate a bin permissions error 807 and forward the error response to user secure storage device 801 for display, e.g. 808. In other embodiments, if the user and/or user device does have permission to store objects in the target bin, e.g. 806, MBIN server 802 may determine if a user bin storage quota has been exhausted, e.g. 809. The user storage quota may be defined on a per user, a per bin, a per bin group, and/or the like basis. Storage quotas may be based on the number of objects stored in a given bin, the number of objects stored across all user bins, the size of objects stored in one or more bins, the bandwidth consumed by a user or a bin by storing or retrieving bin objects, and/or the like. If the user bin storage quota has been exhausted MBIN server 802 may invoke a user bin storage upgrade procedure, e.g. 810, which may prompt the user to upgrade their bin storage in real time and as such not require an additional encrypted object storage request. In other embodiments, the exhausted storage quota may generate a future transaction request to the user and result in a bin storage error being returned to user secure storage device 801.

If the MBIN server determines that a user bin storage quota has not been exhausted, e.g. 809, the server may thereafter apportion storage for the bin object, e.g. 811, such as by determining the encrypted or decrypted size of the object being stored and apportioning a proportional amount of bin storage. The MBIN server may generate a unique global identifier for the object, e.g. 812. The object identifier may be unique across all MBIN managed bins, or unique only to a user or a bin. The MBIN server may then update the bin database using the received bin object metadata and the object unique identifier, e.g. 813.

In one embodiment, the MBIN server may query an endpoint database containing information about bin storage object servers and user bin redundancy requirements. User bin redundancy requirements may be set on a per bin, a per user, a per device, and/or the like and may define a number of object storage servers which must contain copies of any bin objects stored in a given bin. Bin redundancy object requirements may be employed in order to protect against MBIN object server failure, with more bin object copies being used for sensitive or highly valuable bin objects. If enough object storage servers are not available to meet the bin redundancy requirements, e.g. 815, the MBIN server may determine whether the bin permissions allow a temporarily reduced bin redundancy requirements. The temporarily reduced bin redundancy requirement may allow the storage of a bin object in less than the required number of bin object storage servers for a temporary period of time, such as may be the case when object storage servers are undergoing maintenance or otherwise unavailable but are expected to be available within a time quantum. If the bin permissions do not allow temporarily reduced bin redundancy requirements, e.g. 816, the MBIN server may generate a bin redundancy requirements error 817 and transmit the error to user secure storage device 801 for display, e.g. 808. If user bin permissions do allow temporarily reduced bin redundancy requirements, e.g. 816, the MBIN server may set bin redundancy requirements to the number of available bin object storage servers and set a follow-up trigger configured to initiate the storage of the bin object on additional servers after a time quantum, e.g. 818. If the MBIN is configured to allow a user device to directly transfer encrypted object from the device to an object storage server, e.g. 819, the MBIN server may, while the number of object storage servers storing the encrypted object is less than the bin redundancy requirement, initiate or instruct the device to transfer the encrypted object directly to one or more object storage servers, e.g. 820. The user secure storage device 801 may thereafter transfer the encrypted object to the designated object storage server, e.g. 821, and return the transfer status to MBIN server 802. In other embodiments, if direct device to object storage server transfer support is not enabled, e.g. 819, and while the count of the number of object storage servers containing the encrypted bin object is less than the bin redundancy requirement the MBIN server may itself transfer the object to one or more object storage servers, e.g. 822. The logic flow continues with respect to FIG. 8B.

With respect to FIG. 8B, in one embodiment, if the encrypted object storage request is a bin that is shared with one or more devices and/or one or more users, e.g. 823, then the MBIN server may determine whether the appropriate bin encryption key has been encrypted with the target devices or target users public key and transmitted to the target user or target device, e.g. 824. If the target's bin encryption key has not been forwarded then MBIN server 802 may request a bin key share distribution refresh 825 via user secure storage device 801. The user secure storage device may thereafter encrypt the appropriate bin key with each shared target device's or shared target user's public key, e.g. 826. MBIN server 802 may thereafter transmit the encrypted bin key to the target devices or target users as well as store a copy in an escrow database in communication with the MBIN server, e.g. 827. In one embodiment, the MBIN server may store the encrypted object in a bin associated with the shared user or a shared device. In so doing, objects stored in one bin may be automatically synchronized with additional bins by the MBIN without providing the MBIN server with access to the unencrypted objects or to credentials utilized by any device and/or any user to access the various versions of the encrypted bin object. In one embodiment, MBIN server 802 may then run post encryption object bin storage processing on a bins that have been changed, e.g. 829. The post encryption object processing may include the rotation of device keys, the rotation of API access keys, the decryption and re-encryption of bins or bin objects, and/or the like. Upon completion of any required post object bin storage processing, MBIN server 802 may generate a bin storage request success message, e.g. 830, and transmit the success message to user secure storage device 801 for display, e.g. 831.

FIG. 9 shows an example data flow illustrating aspects of bin object retrieval, in one embodiment of the MBIN. In one embodiment, a user desiring to retrieve an encrypted bin object stored either locally on the user device or in an MBIN cloud may provide a bin object retrieval request 905. In embodiments where the bin object is stored in a user device local storage 904, the user may additionally provide a PIN input, e.g. 905. In one embodiment, the user device may transmit an encrypted object retrieval request 906 to MBIN server 902. In other embodiments, the encrypted object retrieval request 906 may be sent directly to an MBIN object server 903. In still other embodiments, the MBIN object server 903 and MBIN server 902 may be combined into one server or may run as services locally on a user's device. An example encrypted object retrieval request 906, substantially in the form of an HTTP(S) POST message including XML-formatted data, is provided below:

```
POST /bin_object_retrieve.php HTTP/1.1
Host: www.MBINserver.com
Content-Type: Application/XML
Content-Length: 667
<?XML version = "1.0" encoding = "UTF-8"?>
<bin_object_retrieval_request>
   <timestamp>2025-12-12 15:22:43</timestamp>
   <message_credentials type="device_api_key">
      <auth_key>h767kwjiwnfe456#niimidrtsxbi</auth_key>
   </message_credentials>
   <bin_objects count="2">
      <bin_object uid="16545623-grfdrtere" />
      <bin_object uid="87654344-defrszxjy" />
   </bin_objects>
</bin_object_retrieval_request>
```

In one embodiment, MBIN server 902 may initiate a bin retrieval object request 907 to MBIN server 903. The MBIN object server may thereafter retrieve the encrypted object and transmit the encrypted object as an object retrieval response to the user device, e.g. 908. An example encrypted object retrieval response 908, substantially in the form of an HTTP(S) POST message including XML-formatted data, is provided below:

```
POST /bin_object_retrieval_response.php HTTP/1.1
Host: www.userdevice.com
Content-Type: Application/XML
Content-Length: 667
<?XML version = "1.0" encoding = "UTF-8"?>
<bin_object_retrieval_response>
    <timestamp>2025-12-12 15:22:43</timestamp>
    <message credentials type="device_api_key">
        <auth_key>h767kwjiwnfe456#niimidrtsxbi</auth_key>
    </message_credentials>
    <encrypted_bin_object id="16545623-grfdrtere"
            num="1" count="2">
        <object_metadata>
            <type val="image" />
            <format val="PNG" />
            <user_description val="My license front" />
        </object_metadata>
        <object_content type="contentstream">
            ‰E3UDs˘ˆ {ÅžØ©ääÇ f⁵55 9±õPôHôHÅ+buq
            ó8»˙¶¢ØôcÆ †X}"•1Žỹº"äOl‰oIÏE˂Ø"pŽ¦<÷»
            6cÄîâØ² Ð ôîRlìù=æÿïŒ - ˉûùØx˙=Î[Ûr"5sj
            îäs©ôúØ"ÖìD`ØÕ Á±èÇ ùxt6w¦s¼ÒÒYD'a6¹³d
        </object_content>
    </encrypted_bin_object>
    <encrypted_bin_object id="87654344-defrszxjy"
            num="2" count="2">
        ...
    </encrypted_bin_object>
</bin_object_retrieval_response>
```

In embodiments where PIN-based storage has been enabled or authorized, the user device may initiate an encrypted private key and an encrypted bin key request 909 to user device local storage 904. In response, to local storage may provide the user's encrypted private key, which in some embodiments is encrypted using the PIN-based key, and the encrypted bin key corresponding to the encrypted object bin, e.g. 910. In one embodiment, the user device may use the user PIN to generate a PIN key, such as by utilizing a key derivation function. The user device may then utilize the pin key to decrypt the received private key, e.g. 911. Upon retrieval of the user's private key the user device may thereafter decrypt the bin key utilizing the user's private key, e.g. 912. Upon obtaining the decrypted bin key, the user device may finally decrypt the received encrypted object to produce the unencrypted bin object in a usable form, e.g. 913, such as a photo for viewing or a document for editing.

FIG. 10 shows an example data flow illustrating aspects of bin applications, in one embodiment of the MBIN. In one embodiment, MBIN capabilities described herein may be utilized as the basis upon which applications may run in a secure environment and securely exchange information with other users. In so doing, user privacy may be enhanced such that intermediate entities that may obtain access to communications between bin applications and/or between bin application devices may be prevented from determining the nature of the bin application communication and/or the communications content. In one embodiment, a bin template may be extended to define a bin application. In one embodiment, and bin server 1001 may transmit an encrypted bin application setup definition 1006 to user device 1003. An example encrypted bin application setup definition 1006, substantially in the form of an HTTP(S) POST message including XML-formatted data, is provided below:

```
POST /bin_application_setup.php HTTP/1.1
Host: www.server.com
Content-Type: Application/XML
Content-Length: 667
```

-continued

```
<?XML version = "1.0" encoding = "UTF-8"?>
<bin_application_setup>
    <timestamp>2025-12-12 15:22:43</timestamp>
    <message_credentials type="device_api_key">
        <auth_key>h767kwjiwnfe456#niimidrtsxbi</auth_key>
    </message_credentials>
    <bin_application name="bin_object_comments">
        <attach_to bin_id="765543" bin_name="work_bin" />
        <interations>
            <menu location="bin_object_view_menu">
                <item value="Add Comment" />
                    <type val="text_input"
                        name="the_comment"
                        prompt="Enter your bin doc comment:" />
                    <after_invoke
                        action="create_object"
                        object_name=$APP['uid'+the_comment]
                        object_bin=$APP[shared_app_bin]
                        encrypt_object_with=$APP[shared_app_bin] [key]
                        object_type="application_message"
                        object_format="JSON" />
                </item>
                <item value="View Comment" />
                    <type val=$APP[bin] [object_id] />
                    <after_invoke
                        action="display_from_app_storage"
                        storage name="comment_storage"
                        object_name="prefix:"+$BIN[$OBJ] ['uid'] />
                </item>
                <item value="Remove Comment" />
                    <type val="select" name="comment_to_remove"
                        populate_from="comment_storage"
                        return="comment_text">
                    <after_invoke
                        action="remove_object"
                        object_name=$APP['uid'+comment_to_remove]
                        object_bin=$APP[shared_app_bin]
                        encrypt_object_with=$APP[shared_app_bin] [key]
                        object_type="application_message"
                        object_format="JSON" />
                </item>
            </menu>
        </interactions>
        <monitor_for_changes val=$APP[shared_app_bin] />
        <application_storage name="comment_storage">
            <for type="inbound_encrypted_app_object">
                <action type="retrieve_object" />
                <action type="decrypt_object"
                    key=$APP[shared_app_bin] [key] />
                <action type="update_storage" val="comment_storage"/>
            </for>
            <for type="outbound_encrypted_app_object">
                <action type="update_display" />
            </for>
        </application_storage>
    </bin_application>
</bin_application_setup>
```

The user device may thereafter instantiate the bin application and/or attach the instantiated bin application to an already instantiated bin, e.g. 1007. In embodiments where multiple user devices may communicate using the capabilities of a bin application, MBIN server 1001 may transmit additional encrypted bin application setup definitions, e.g. 1006*a*, to other user devices, e.g. 1005, which may themselves instantiate copies of the bin application, e.g. 1007*a*.

In one embodiment, user device 1003 may load an application interaction definition template 1008, such as may be provided in an encrypted bin application setup definition 1006. The application interaction definition template may specify the user interface and/or a modified user interface as well as commands executable by the user device and/or a MBIN application executing on the user device and providing MBIN capabilities. In one embodiment, user 1002 may provide a bin application input 1009. A bin application input may be any of the user comment or post associated with a bin object, a user chat request and/or message to another user of a shared bin, a direct message between users associated with the MBIN service, and/or the like. User device 1003 may thereafter convert the bin application input, which may be in the form of an item selection, a string representing the desired user message, a user device location, and/or the like, and convert the application communication object into a bin object. In some embodiments, the bin object may be substantially in the form of a text file containing a JSON structure parseable by the instantiated application and defined in the encrypted bin application setup definition 1006, 1006a. Further detail regarding a suitable parser for use in instantiating the application interaction definition templates may be found with respect to FIG. 17. In one embodiment, the application communication bin object may be encrypted, marked as a non-user object such that the object may be stored in a bin associated with the application but will otherwise be hidden from users listing objects contained within the bin, and stored in an associated application bin storage area, e.g. 1010. In one embodiment, user device 1003 may transmit an application bin object storage request 1011 to MBIN server 1001. In alternative embodiments, user device 1003 may directly transmit the application bin object storage request to user device 1005. For example, direct user device to user device transfers may be enabled when user devices are in a given proximity to one another. Additionally, the encrypted application bin object may be transferred via the storage request as defined in an chained series of transmission vectors. For example, the chained transmission series may specify that initially the user device shall attempt to deliver the encrypted bin object associated with the instantiated application by a direct user device to user device transfer. In instances where the destination user device is not available, the user device may attempt to store the application bin object on other devices providing MBIN services which may themselves then forward the encrypted object to the destination device when available. The chain series may further specify that where the destination device is not available, and no other MBIN devices that may be able to provide an assisted object transfer are available, an MBIN server 1001 may be utilized for processing the application bin object storage request 1011. In one embodiment, MBIN server 1001 may provide the received application bin object to user device 1005, e.g. 1012. User device 1005 may receive the application bin object and store the object in a shared bin. An application associated with the shared bin may thereafter decrypt the object and invoke a handler associated with the application processing received application messages, e.g. 1013. In one embodiment, the bin application may then provide an output to user 1004, e.g. 1014. In so doing, applications executing on multiple user devices may be facilitated in communicating on behalf of the user and/or in support of bin object services through the use of the MBIN.

Applications, or bin applications, may leverage the various capabilities of the MBIN. Bin applications may utilize any MBIN capability described herein including secure bin object storage, the synchronization of bin objects between multiple bin datastores, the decryption of bin objects, and conversion or transcoding of bin object content, the creation of alternate bin objects, the versioning of bin objects, and/or the like. In some embodiments, bin applications may themselves create new bins (e.g., create new bin object datastores). The bin applications may then monitor the bin objects stored in the bin, add or remove objects from the bin, trigger actions based upon bin contents, and/or the like.

For example, in one embodiment, a bin application may be configured to synchronize user content stored on a cloud storage service such as DropBox™ with a designated bin. The bin application may be configured to periodically download the content of a user's cloud storage and create bin objects corresponding to the contents therein. In one embodiment, the bin application may thereafter delete the files that were synchronized into the bin from the remote cloud storage provider. In so doing, a bin application can automatically secure files previously stored unencrypted on cloud storage services (e.g., by creating encrypted bin objects from the files and removing the unencrypted files from the cloud storage service).

In one embodiment, a bin application may create a bin that is not available to an MBIN user in the same manner as a normal bin described herein. For example, a bin created by a bin application may have its visibility set to hidden and therefore not appear to a user in a list of available bins. Such a configuration of the MBIN may allow bin applications to provide enhanced services to the user. For example, a hidden bin can be utilized as the storage backend for a bin application providing secure messaging services to the user. The bin application may hide the created bin from the user and instead define a custom interface that maps the user's interactions onto base MBIN operations. For example, a secure messaging bin application may describe (e.g., via a bin application definition file) a plurality of user interface screens including interfaces to add a message recipient (e.g., create a shared-bin with the same secure bin application running on a second user's device), to send a secure message (e.g., create an encrypted bin object describing the content of one or more messages between bin application users and synchronize the encrypted bin object to bins associated with the other bin application users), to delete a message (e.g., to delete an encrypted bin object corresponding to a message), and/or the like. As illustrated, a bin application can define interactions to include a number of atomic MBIN operations.

A bin application may, in one configuration, utilize a bin whereby all objects stored in the bin are encrypted using the same symmetric block encryption key (for example, an AES key). In the example messaging system described above, this symmetric key may be made available to each side of the messaging conversation through the use of a shared bin. In such a configuration, upon generation, the symmetric block encryption key may be encrypted using multiple public keys. One of the public keys would correspond to the user or device associated with the local bin application and the encrypted key would be stored locally and/or on a bin datastore synchronization server such that the key is available in the future to the local bin application. Other of the public keys may correspond to a user or device associated with the bin application running on a remote device and in communication with a remote synchronized bin. Once encrypted, the encrypted symmetric block encryption key would then be synchronized to the remote device for use decrypting the contents of the shared bin objects encrypted by the bin application under the given key.

In other configurations of the MBIN, a bin may contain sub-bins. The sub-bins may be logical sub-bins such that they are in fact discrete bins themselves (e.g., not contained by a parent bin) but are presented to and available to a bin application as sub-bins (e.g., forming a hierarchy of bins). In still other configurations, the sub-bins may in fact be bin objects of their parent bins. Sub-bins, whether actual or logical, may be utilized by bin applications to provide enhanced security for bin application functions. For example, the messaging application described above may utilize sub-bins such that a new sub-bin is created periodically by the bin application. A new sub-bin may be created, for example, after a user messaging session expires. A user messaging session expiration may be determined by, for example, the elapsing of a time quantum, the sending of a certain number of messages, and/or the like. In high security configurations of the MBIN, sub-bins may be created for each discrete operation of a bin application. For example, the secure messaging bin application may create a sub-bin for every secure message sent. In so doing, the MBIN may be conceptually thought of as providing bin object level encryption (or, any multiple of bin objects up to and including all objects in a given bin). Regardless of the binning strategy employed by a bin application, the MBIN features discussed herein may be utilized by bins, sub-bins, or any combination therein.

Although the bin application described above was described as utilizing the MBIN shared bin functionality to provide a secure channel between two device users of the MBIN, alternate configurations of the MBIN may utilize a third-party server (or the MBIN itself) as the recipient of shared bin objects. For example, a bin application that transcodes media files between different file formats may create a bin that is paired with the provider of the bin application's servers. The MBIN would then synchronize any bin objects placed in the shared bin with the bin application provider's servers which would transcode the bin object and then reverse synchronize a new bin object from the output. Such a bidirectional synchronization capability, combined with the MBIN's ability to allow bin applications to suppress or hide bins and define custom bin user interfaces (as described herein) allow the MBIN to provide a highly flexible platform for third-party bin applications. In fact, in some configurations, the MBIN may itself act as a third-party bin application provider. For example, the MBIN may offer enhanced bin features such as bin object versioning, enhanced bin object metadata, and/or the like by itself using the bin application platform described herein.

Figure 11:
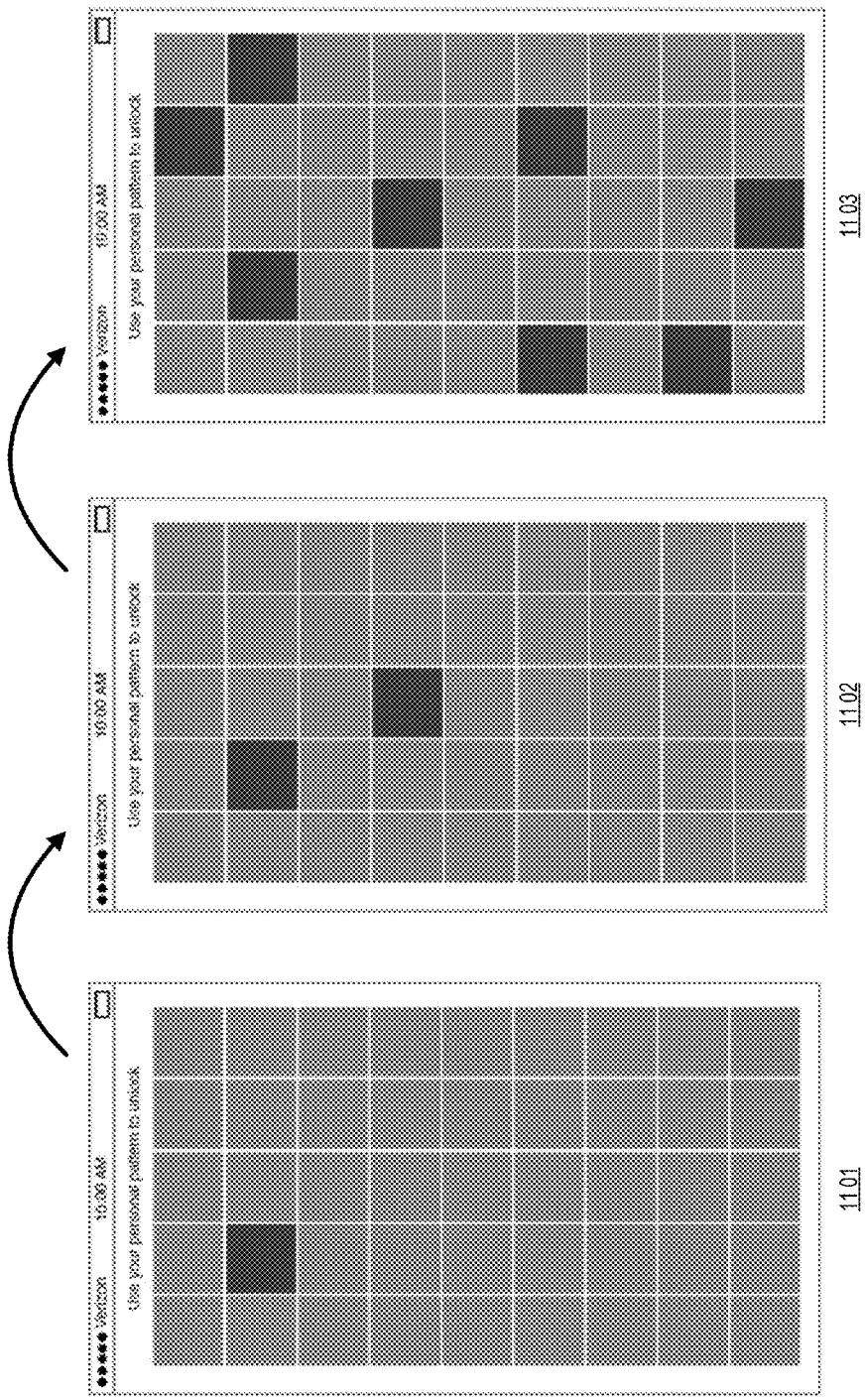
FIG. 11 shows a block diagram illustrating example aspects of visual bin PIN generation and input, in one embodiment of the MBIN.

FIG. 11 shows a block diagram illustrating example aspects of visual bin PIN generation and input, in one embodiment of the MBIN. In one embodiment, an MBIN user may select a PIN for use as a key or for generating a key to encrypt locally stored bin objects and/or encryption keys or API certificates. In an alternative embodiment, the user may be presented with a user interface divided into a plurality of selection areas, e.g. 1101. The user may select areas in order to create a personal pattern, e.g. 1102. Upon selection of a sufficient number of selection areas, the personal pattern chosen by the user may be used as a pin input, such as an input into a key derivation function for generation of an encryption or decryption key. In one implementation, each row of input 1103 may be treated as a single PIN input value. Each row may be represented by the sum of the value of the selected areas. In one embodiment, each selection area in a given row may have a value twice as large as the value of the immediately preceding selection area. For example, the first selection area block in a row may have a value of two while the next block may have a value of four, followed by a block with a value of eight, and so on. The row may thereafter be represented as the sum of the values of the selection locks that have been chosen by the user. For example, in the last row of a chosen user personal pattern, e.g. 1103, a selection of a third block may result in that row receiving a value of eight. Multiple selections in one row may be added together such that the user's personal PIN pattern may be efficiently represented and/or reduced to a series of binary coded decimals for use in a key derivation function.

Figure 12:
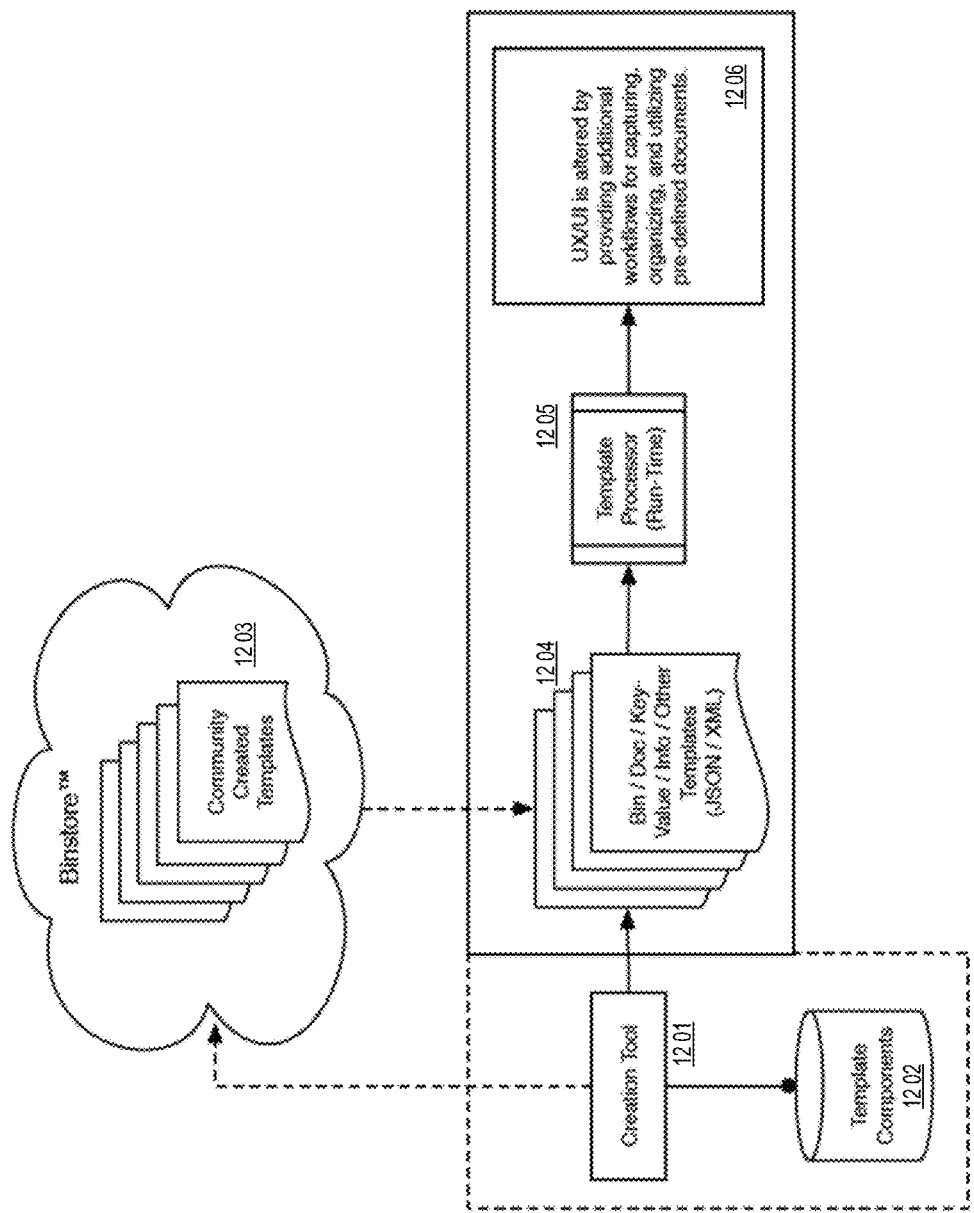
FIG. 12 shows a block diagram illustrating example aspects of bin data and object capture, in one embodiment of the MBIN.

FIG. 12 shows a block diagram illustrating example aspects of bin data and object capture, in one embodiment of the MBIN. In one embodiment, a bin templating system may be provided such that aspects of bins may be customized. Example customizations include predefined categories of bin objects to capture, checklists to follow during bin object capture, tags or keywords associated with objects to be included in a bin based on the template, hierarchical trees for organizing bin objects related to a given special-purpose bin (e.g., a wallet bin containing a tree structure of various components and sub-component items usually found in a wallet), and/or the like. Templates may be composed of template components, e.g. 1202. Template components may be partial template segments that may be assembled into larger templates. The MBIN may provide a creation tool for assembling template components and/or customizing template components, e.g. 1201. Bin templates may thereafter be uploaded to an MBIN community curated template library, e.g. 1203, for use by other MBIN users or devices. In so doing, bin templates may be developed to define object storage areas of use to multiple MBIN users and thereafter shared with a wide community of MBIN users. Templates stored in an MBIN community template library 1203 and/or templates created by template creation tool 1201 may provide or create templates that define one or more bins structures. Bin templates may be in the form of JSON and/or XML data structures that contain information regarding bin parameters such as bin names, documents that may be stored within a bin, and/or the like. In one embodiment, the bin template may take the form of a key-value store, e.g. 1204. Upon invocation of a template to create an instantiated bin, a bin template processor running on a user device and/or on a bin cloud server may instantiate a bin object meeting the requirements of the template, e.g. 1205. In one embodiment, a user interface and or user experience on a user device may be altered via the bin template, such as by the provision of custom logic contained within a bin template. The altered user experience may provide for additional workflows for capturing, organizing and utilizing documents and/or predefined documents, e.g. 1206.

Figure 13:
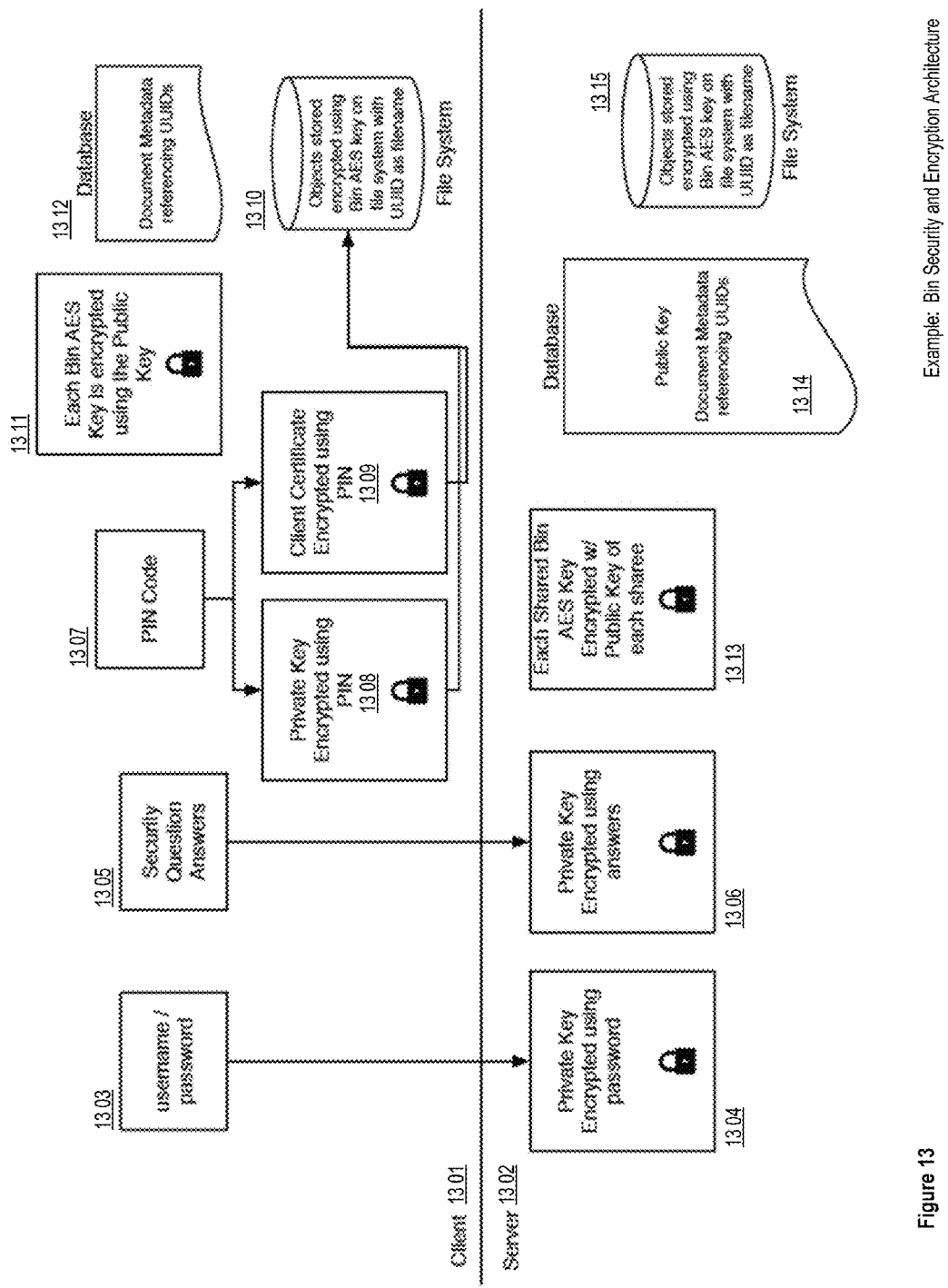
FIG. 13 shows a block diagram illustrating aspects of an example MBIN bin security and encryption architecture, in one embodiment of the MBIN.

FIG. 13 shows a block diagram illustrating aspects of an example MBIN bin security and encryption architecture, in one embodiment of the MBIN. In one embodiment, an MBIN client, e.g. 1301, may be a user device approved to or with access to store encrypted bin objects locally, e.g. on the client, and remotely on bin server 1302. In one embodiment, a username and/or password, e.g. 1303, may be utilized to encrypt a private key for storage on server 1302, e.g. 1304. Additionally, answers to one or more security questions, e.g. 1305, may be used to encrypt a private key for storage on MBIN server 1302, e.g. 1306. In one embodiment, a pin code 1307 may be a numeric input, and alphanumeric input, a gesture, a series of screen taps, a device location, a photographic input, and/or the like. The pin code may be utilized in conjunction with a key derivation function as described herein to encrypt a private key, e.g. 1308. Additionally, the pin derived encryption key may be utilized to encrypt a client certificate and/or an API access key, e.g. 1309. In other embodiments, the PIN may be utilized directly as a encryption key and not require a key derivation function to be used in encrypting private key 1308 and/or client certificate/API access key 1309. In some embodiments, objects are stored on the client device 1301 using bin AES keys, e.g. 1301. Objects stored may be stored with a unique identifier that obfuscates or hides the content, the size, or other parameters about the underlying unencrypted object. Bin AES keys used in the encryption of objects, e.g. 1301, may themselves be encrypted using a public key, e.g. 1311, corresponding to the private key. A local client database may, in one embodiment, store metadata such as filenames, file descriptions, file types, ownership and/or access permissions, and/or the like and reference unique object identifiers of encrypted objects associated with the metadata entries, e.g. 1312.

Bin server 1302 may additionally contain copies of the AES keys associated with shared bins whereby the AES keys have been encrypted with the public key of each shared user and/or device, e.g. 1313. The public keys associated with users and/or devices as well as document metadata that may reference unique object identifiers may be stored in a database in communication with bin server 1302, e.g. 1314. In one embodiment, encrypted bin objects may be stored in a server data store, e.g. 1315, with a unique encrypted object identifier as the filename.

Figure 14:
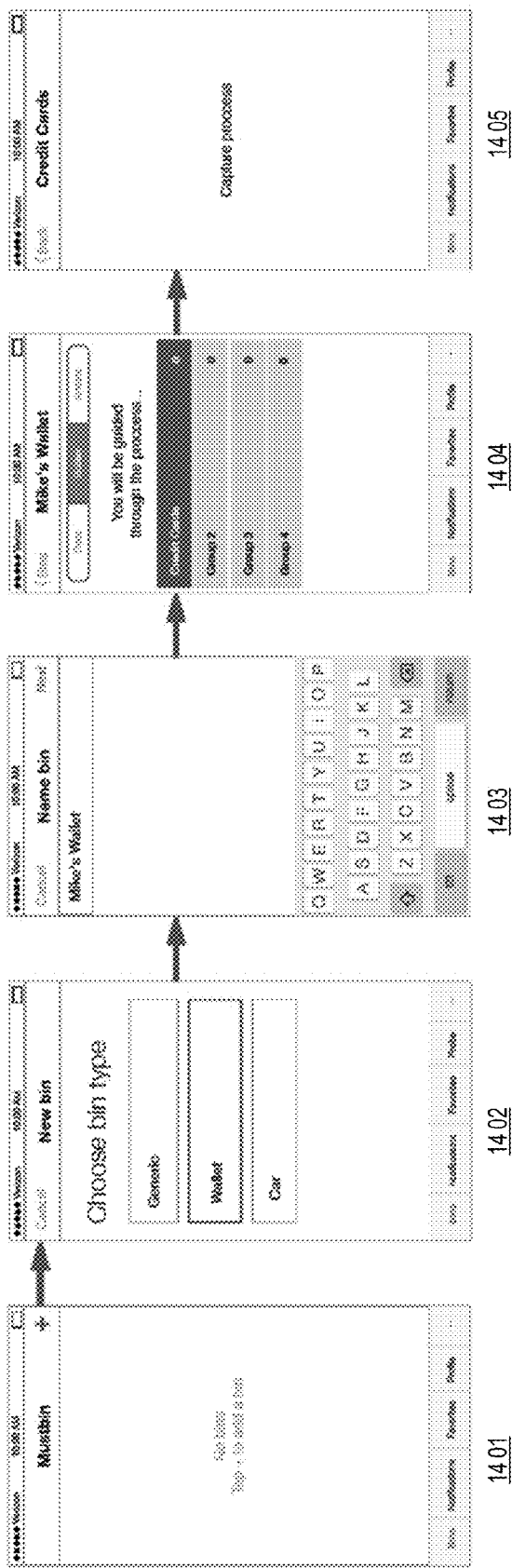
FIG. 14 shows a block diagram illustrating aspects of an example MBIN bin creation and object population workflow, in one embodiment of the MBIN.

FIG. 14 shows a block diagram illustrating aspects of an example MBIN bin creation and object population workflow, in one embodiment of the MBIN. In one embodiment, an MBIN, e.g. 1401, may provide a feature to add a bin. In some embodiments, a user may choose from preconfigured bin types, e.g. 1402, such as a wallet bin and/or a car bin. Furthermore, in some embodiments a generic or default bin may be chosen. In one embodiment, after selecting a bin type, the user may provide a bin name, e.g. 1403, and begin to load content in their created bin. In one example, a guide is provided to assist the user in populating a bin with encrypted bin objects, e.g. 1404. For an object such as a credit card, a capture process may be provided, e.g. 1405, that may instruct the user to, for example, photograph the front and back of a credit card.

Figure 15:
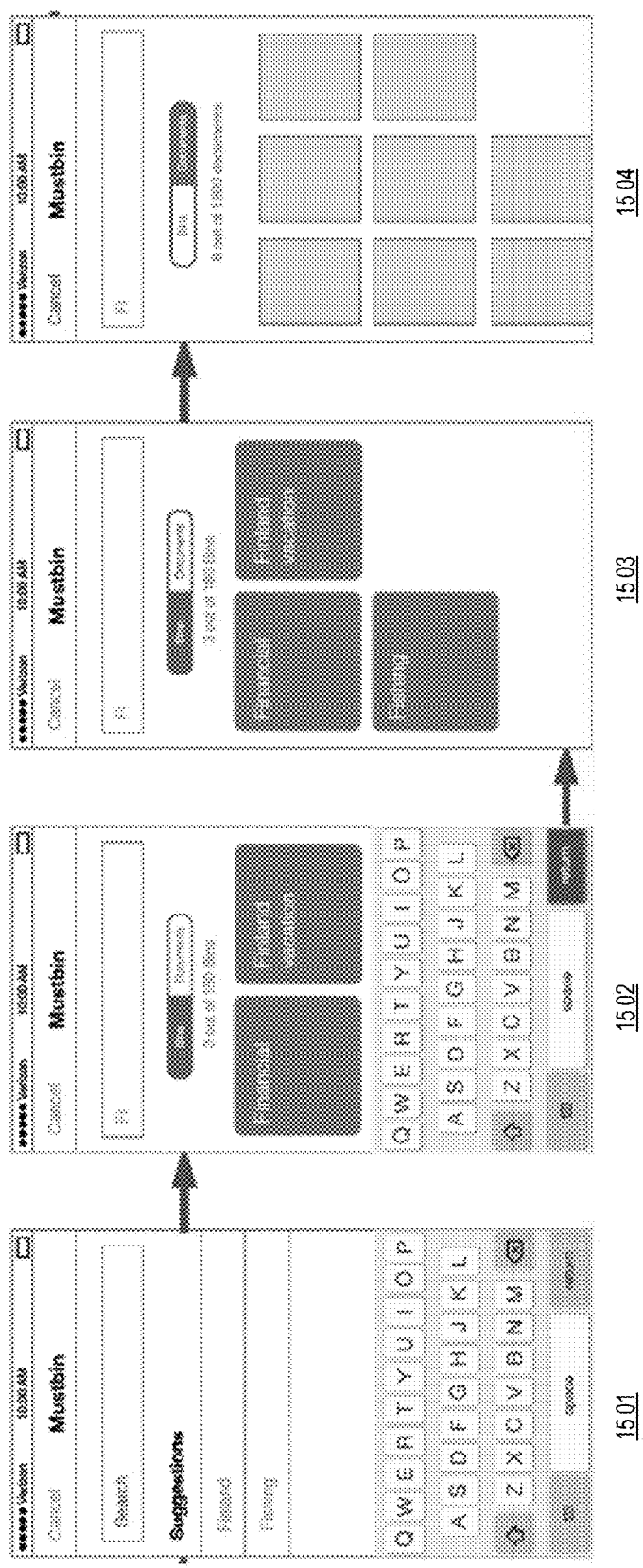
FIG. 15 shows a block diagram illustrating aspects of an example MBIN bin and object search workflow, in one embodiment of the MBIN.

FIG. 15 shows a block diagram illustrating aspects of an example MBIN bin and object search workflow, in one embodiment of the MBIN. In one embodiment, as the user begins to type a search string to search their encrypted objects and/or bins, suggested search terms may be provided, e.g. 1501. In one embodiment, bins meeting the search string may be displayed, e.g. 1502. For example, the bin name may be utilized to search for bins meeting the search string, e.g., 1503. In other embodiments, metadata such as bin description, size, bin object type, and/or the like may be utilized and/or searched against. In some embodiments, the user may select to search for documents or bin objects contained within bins, e.g. 1504, and objects from one or more bins may be displayed in a single search result interface.

Figure 16:
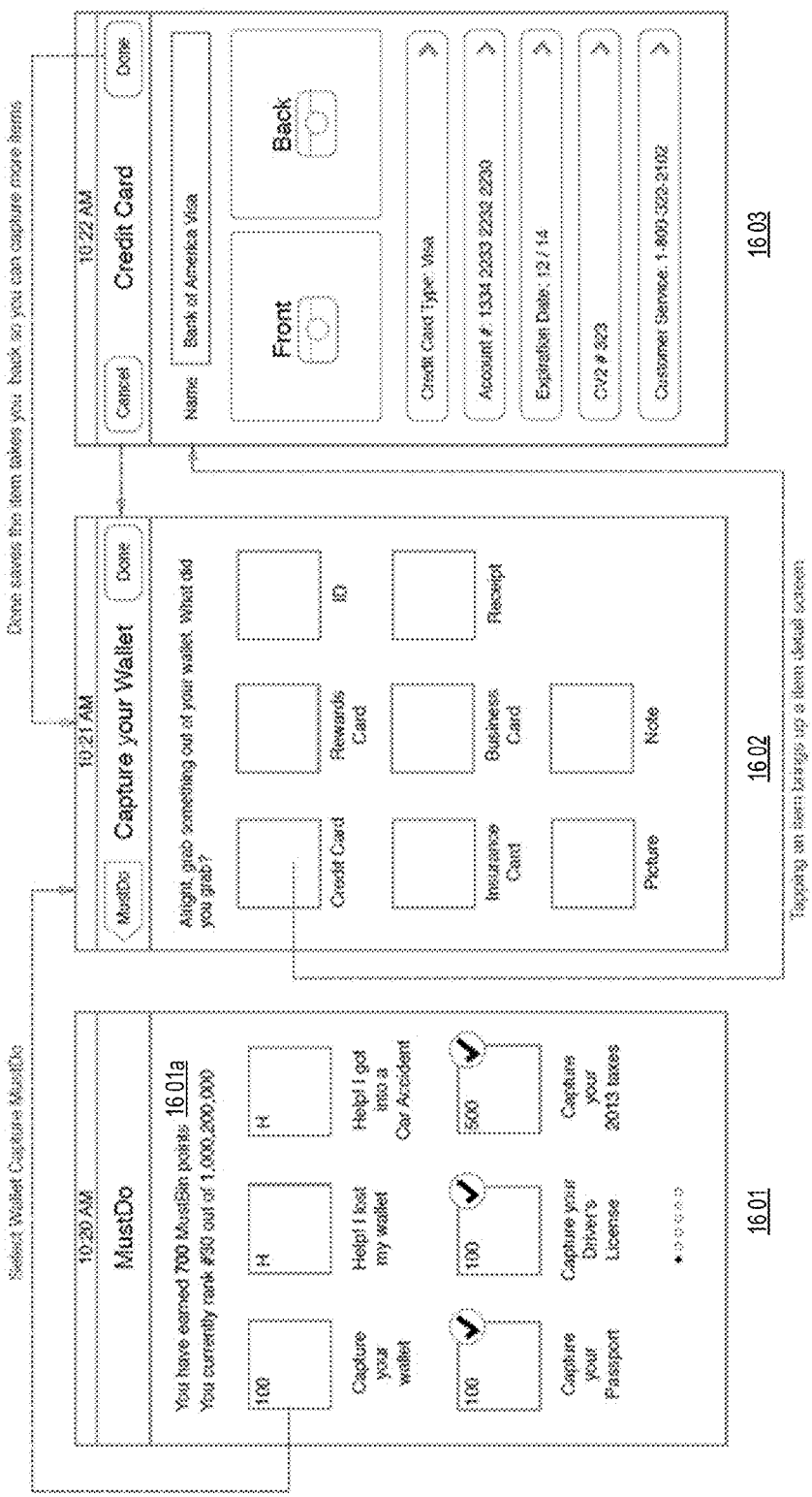
FIG. 16 shows a block diagram illustrating aspects of an example MBIN bin object population, in one embodiment of the MBIN.

FIG. 16 shows a block diagram illustrating aspects of an example MBIN bin object population, in one embodiment of the MBIN. In one embodiment, bin object population may have one or more workflows associated with capturing a sequence of objects into an existing and/or a new bin, e.g. 1601. In some embodiments, points may be awarded for completing certain capture scenarios such as for example a wallet capture, for capturing a single item such as for example a drivers license, for capturing a single item of increased importance, and/or the like, e.g., 1601a. In some embodiments, points may be redeemed for MBIN services such as increased storage space, additional redundancy storage, increased sharing capabilities, additional features such as optical character recognition for bin objects, and/or the like. In one example, if the user chooses to capture their wallet, an interface of items typically found in a wallet may be displayed, e.g. 1602. Tapping an item in the interface may bring up an item detail screen, e.g. 1603, that prompts the user for information about the item to be captured as a bin object. In some embodiments, all of the data about an item such as a credit card may be included in one bin object, such as for example by using a JSON structure to represent the component item fields and field values. In some examples, a bin template may provide the fields and/or field definitions utilized on an item detail screen. For example, a bin template may specify an item name such as a credit card name, a slot for an image representing the front and/or back of a credit card, a credit card type, an account number, expiration date, a CCV code, a customer service number and/or the like. In some embodiments, information from a picture taken of the front and/or back of a card or object may be utilized to pre-fill information in the remaining item detail fields.

MBIN Controller

Figure 17:
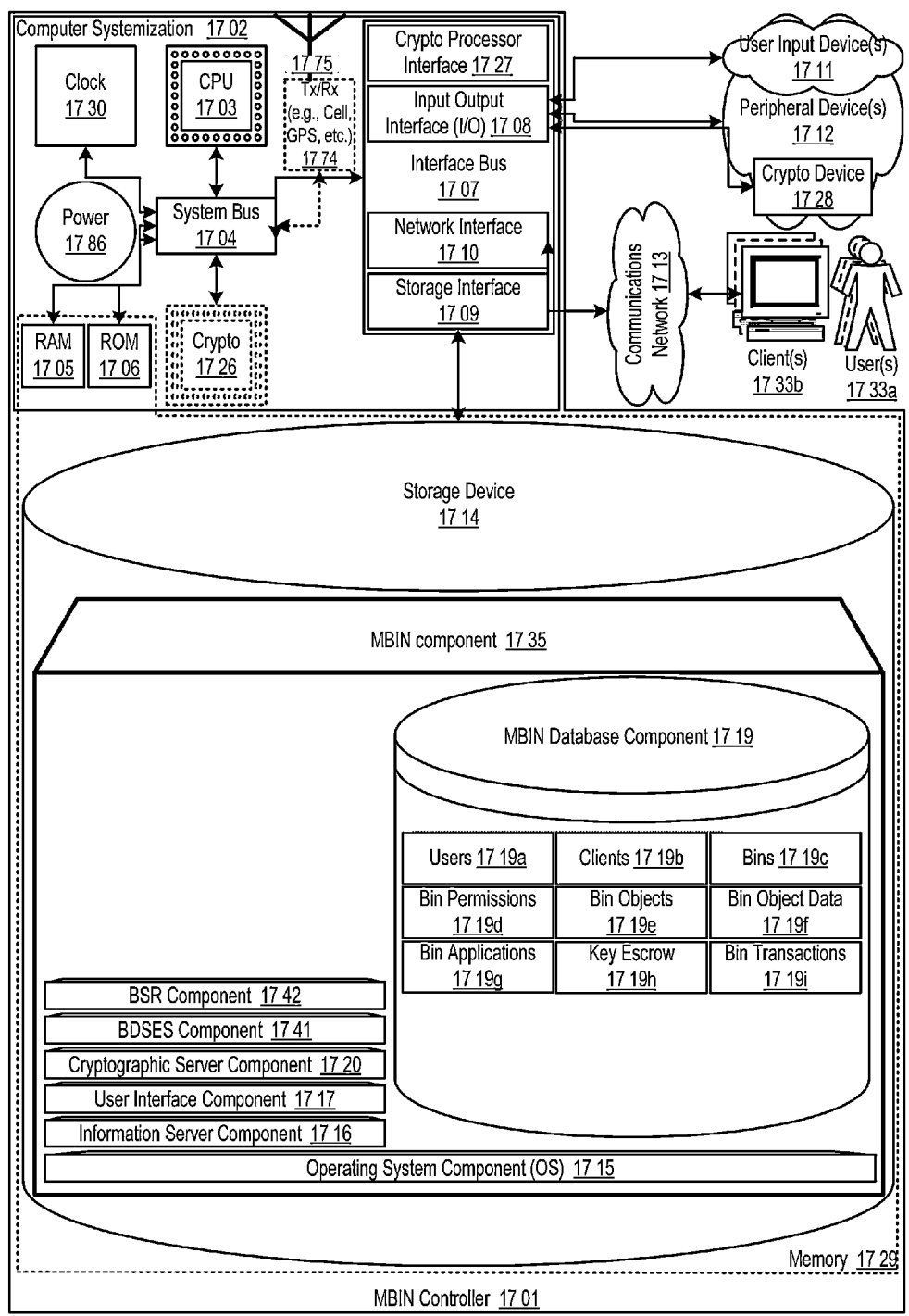
FIG. 17 shows a block diagram illustrating aspects of an exemplary embodiment of a MBIN user interface controller, in one embodiment.

FIG. 17 shows a block diagram illustrating embodiments of a MBIN controller. In this embodiment, the MBIN controller 1701 may serve to aggregate, process, store, search, serve, identify, instruct, generate, match, and/or facilitate interactions with a computer through various technologies, and/or other related data. The MBIN can, for example, be configured such that the various components described herein execute on MBIN Server 702, MBIN Object Server 703 and/or user device 701. Because each component of the MBIN may be distributed, as described below, the MBIN Server 702 and the MBIN Object Server 703 may perform portions of the program logic assigned to them or portions of the program logic normally assigned to the other. In another example, the BDSES Component 1741 (described above with respect to FIG. 5) can execute on User Secure Storage Device 502 as shown. In an alternative configuration, the BDSES Component 1741 may be installed on MBIN Server 501 and provide services to User Secure Storage Device 502 via the networked program execution capabilities described below.

Typically, users, which may be people and/or other systems, may engage information technology systems (e.g., computers) to facilitate information processing. In turn, computers employ processors to process information; such processors 1703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MBIN controller 1701 may be connected to and/or communicate with entities such as, but not limited to: one or more users from user input devices 1711; peripheral devices 1712; an optional cryptographic processor device 1728; and/or a communications network 1713.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The MBIN controller 1701 may be based on computer systems that may comprise, but are not limited to, components such as: a computer systemization 1702 connected to memory 1729.

Computer Systemization

A computer systemization 1702 may comprise a clock 1730, central processing unit ("CPU(s)" and/or "processor(s)" (these terms are used interchangeably throughout the disclosure unless noted to the contrary)) 1703, a memory 1729 (e.g., a read only memory (ROM) 1706, a random access memory (RAM) 1705, etc.), and/or an interface bus 1707, and most frequently, although not necessarily, are all interconnected and/or communicating through a system bus 1704 on one or more (mother)board(s) 1702 having conductive and/or otherwise transportive circuit pathways through which instructions (e.g., binary encoded signals) may travel to effectuate communications, operations, storage, etc. The computer systemization may be connected to a power source 1786; e.g., optionally the power source may be internal. Optionally, a cryptographic processor 1726 and/or transceivers (e.g., ICs) 1774 may be connected to the system bus. In another embodiment, the cryptographic processor and/or transceivers may be connected as either internal and/or external peripheral devices 1712 via the interface bus I/O. In turn, the transceivers may be connected to antenna(s) 1775, thereby effectuating wireless transmission and reception of various communication and/or sensor protocols; for example the antenna(s) may connect to: a Texas Instruments WiLink WL1283 transceiver chip (e.g., providing 802.1 in, Bluetooth 3.0, FM, global positioning system (GPS) (thereby allowing MBIN controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1729 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the MBIN controller and beyond through various interfaces. Should processing requirements dictate a greater amount speed and/or capacity, distributed processors (e.g., Distributed MBIN), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the MBIN may be achieved by implementing a microcontroller such as CAST's R8051XC2 microcontroller; Intel's MCS 51 (i.e., 8051 microcontroller); and/or the like. Also, to implement certain features of the MBIN, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MBIN component collection (distributed or otherwise) and/or features may be implemented via the microprocessor and/or via embedded components; e.g., via ASIC, coprocessor, DSP, FPGA, and/or the like. Alternately, some implementations of the MBIN may be implemented with embedded components that are configured and used to achieve a variety of features or signal processing.

Depending on the particular implementation, the embedded components may include software solutions, hardware solutions, and/or some combination of both hardware/software solutions. For example, MBIN features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the MBIN features. A hierarchy of programmable interconnects allow logic blocks to be interconnected as needed by the MBIN system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MBIN may be developed on regular FPGAs and then migrated into a fixed version that more resembles ASIC implementations. Alternate or coordinating implementations may migrate MBIN controller features to a final ASIC instead of or in addition to FPGAs. Depending on the implementation all of the aforementioned embedded components and microprocessors may be considered the "CPU" and/or "processor" for the MBIN.

Power Source

The power source 1786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1786 is connected to at least one of the interconnected subsequent components of the MBIN thereby providing an electric current to all subsequent components. In one example, the power source 1786 is connected to the system bus component 1704. In an alternative embodiment, an outside power source 1786 is provided through a connection across the I/O 1708 interface. For example, a USB and/or IEEE 1394 connection carries both data and power across the connection and is therefore a suitable source of power.

Interface Adapters

Interface bus(ses) 1707 may accept, connect, and/or communicate to a number of interface adapters, conventionally although not necessarily in the form of adapter cards, such as but not limited to: input output interfaces (I/O) 1708, storage interfaces 1709, network interfaces 1710, and/or the like. Optionally, cryptographic processor interfaces 1727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1709 may accept, communicate, and/or connect to a number of storage devices such as, but not limited to: storage devices 1714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1710 may accept, communicate, and/or connect to a communications network 1713. Through a communications network 1713, the MBIN controller is accessible through remote clients 1733b (e.g., computers with web browsers) by users 1733a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed MBIN), architectures may similarly be employed to pool, load balance, and/or otherwise increase the communicative bandwidth required by the MBIN controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1710 may be used to engage with various communications network types 1713. For example, multiple network interfaces may be employed to allow for the communication over broadcast, multicast, and/or unicast networks.

Input Output interfaces (I/O) 1708 may accept, communicate, and/or connect to user input devices 1711, peripheral devices 1712, cryptographic processor devices 1728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1711 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1712 may be connected and/or communicate to I/O and/or other facilities of the like such as network interfaces, storage interfaces, directly to the interface bus, system bus, the CPU, and/or the like. Peripheral devices may be external, internal and/or part of the MBIN controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the MBIN controller may be embodied as an embedded, dedicated, and/or monitor-less (i.e., headless) device, wherein access would be provided over a network interface connection.

Cryptographic units such as, but not limited to, microcontrollers, processors 1726, interfaces 1727, and/or devices 1728 may be attached, and/or communicate with the MBIN controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1729. However, memory is a fungible technology and resource, thus, any number of memory embodiments may be employed in lieu of or in concert with one another. It is to be understood that the MBIN controller and/or a computer systemization may employ various forms of memory 1729. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1729 will include ROM 1706, RAM 1705, and a storage device 1714. A storage device 1714 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1729 may contain a collection of program and/or database components and/or data such as, but not limited to: operating system component 1715; information server component 1716; user interface component 1717; MBIN database component 1719; cryptographic server component 1720; BDSES Component 1741; BSR Component 1742; and/or the like (i.e., collectively a component collection). The aforementioned components may be incorporated into (e.g., be sub-components of), loaded from, loaded by, or otherwise operatively available to and from the MBIN component(s) 1735.

Any component may be stored and accessed from the storage devices and/or from storage devices accessible through an interface bus. Although program components such as those in the component collection, typically, are stored in a local storage device 1714, they may also be loaded and/or stored in other memory such as: remote "cloud" storage facilities accessible through a communications network; integrated ROM memory; via an FPGA or ASIC implementing component logic; and/or the like.

Operating System Component

The operating system component 1715 is an executable program component facilitating the operation of the MBIN controller. Typically, the operating system facilitates access of I/O, network interfaces, peripheral devices, storage devices, and/or the like. The operating system may be a highly fault tolerant, scalable, and secure system such as: Unix and Unix-like system distributions (such as AT&T's UNIX; Berkley Software Distribution (BSD) variations such as FreeBSD, NetBSD, OpenBSD, and/or the like; Linux distributions such as Red Hat, Debian, Ubuntu, and/or the like); and/or the like operating systems. However, more limited and/or less secure operating systems also may be employed such as Apple OS-X, Microsoft Windows 2000/2003/3.1/95/98/CE/Millenium/NT/Vista/XP/Win7 (Server), and/or the like. An operating system may communicate to and/or with other components in a component collection, including itself, and/or the like. Most frequently, the operating system communicates with other program components, user interfaces, and/or the like. The operating system, once executed by the CPU, may enable the interaction with communications networks, data, I/O, peripheral devices, program components, memory, user input devices, and/or the like. The operating system may provide communications protocols that allow the MBIN controller to communicate with other entities through a communications network 1713. Various communication protocols may be used by the MBIN controller as a subcarrier transport mechanism for interaction, such as, but not limited to: multicast, TCP/IP, UDP, unicast, and/or the like.

Information Server Component

An information server component 1716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., ICQ, Internet Relay Chat (IRC), Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Representational State Transfer (REST) and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MBIN controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MBIN database component 1719, operating system component 1715, other program components, user interfaces, and/or the like.

Access from the Information Server Component 1716 to the MBIN database component 1719 may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MBIN. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the MBIN as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser. Also, an information server may contain, communicate, generate, obtain, and/or provide program component, system, user, and/or data communications, requests, and/or responses.

User Interface Component

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows, web interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 1717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating system component 1715, other program components, and/or the like. The user interface may contain, communicate, generate, obtain, and/or provide program component, system, user, and/or data communications, requests, and/or responses.

Cryptographic Server Component

A cryptographic server component 1720 is a stored program component that is executed by a CPU 1703, cryptographic processor 1726, cryptographic processor interface 1727, cryptographic processor device 1728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael (AES), RSA, Secure Hash Algorithm (SHA), Secure Socket Layer (SSL), Secure Hypertext Transfer Protocol (HTTPS), and/or the like. Employing such encryption security protocols, the MBIN may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the MBIN component to engage in secure transactions if so desired. The cryptographic component facilitates the secure accessing of resources on the MBIN and facilitates the access of secured resources on remote systems; i.e., it may act as a client and/or server of secured resources. Most frequently, the cryptographic component communicates with information server component 1716, operating system component 1715, other program components, and/or the like. The cryptographic component may contain, communicate, generate, obtain, and/or provide program component, system, user, and/or data communications, requests, and/or responses.

MBIN Database Component

The MBIN database component 1719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the MBIN database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1719 includes several tables 1719a-i. A Users table 1719a may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. A Clients table 1719b may include fields such as, but not limited to: client_id, client_name, client_ip, client_type, client_model, operating_system, os_version, app_installed_flag, and/or the like. A Bins table 1719c may include fields such as, but not limited to: bin_id, bin_name, bin_owner_user_id, bin_shared_user_id_array, bin_storage_limits, bin_template, bin_created_date, bin_expiration_date, bin_max_objects, bin_applications_installed and/or the like. A Bin Permissions table 1719d may include fields such as, but not limited to: bin_permission_id, bin_id, user_id, permission_type, permission_description, permission_command, permission_value and/or the like. A Bin Objects table 1719e may include fields such as, but not limited to: bin_object_id, bin_id, unique_bin_object_identifier, bin_object_size, is_shared_bin_object, bin_object_permissions and/or the like. A Bin Object Data table 1719f may include fields such as, but not limited to: bin_object_data_id, bin_object_id, description, object_data_key, object_data_value and/or the like. A Bin Applications table 1719g may include fields such as, but not limited to: bin_application_id, bin_id, outgoing_app_objects_bin, incoming_app_objects_bin, bin_application_name, authorized_bin_user_ids, authorized_bin_ids, per_hour_bin_application_cost and/or the like. A Key Escrow table 1719h may include fields such as, but not limited to: key_escrow_id, user_id, key_type, key_encryption_settings, key and/or the like. A Bin Transactions table 1719i may include fields such as, but not limited to: bin_transaction_id, bin_id, user_id, bin_application_id, trans_datetime, trans_amount, is_recurring and/or the like. Any of the aforementioned tables may support and/or track multiple entities, accounts, users and/or the like.

In one embodiment, the MBIN database component may interact with other database systems. For example, when employing a distributed database system. In such an embodiment, queries and data access by any MBIN component may treat the combination of the MBIN database component results and results from a second segment in a distributed database system as an integrated database layer. Such a database layer may be accessed as a single database entity, for example through MBIN database component 1719, by any MBIN component.

In one embodiment, user programs may contain various user interface primitives, which may serve to update the MBIN. Also, various accounts may require custom database tables depending upon the environments and the types of clients the MBIN may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1719*a-i*. The MBIN may be configured to keep track of various settings, inputs, and parameters via database controllers.

The MBIN database may communicate to and/or with other components in a component collection, including itself, and/or facilities of the like. Most frequently, the MBIN database communicates with the MBIN component, other program components, and/or the like. The database may contain, retain, and provide information regarding other nodes and data.

MBIN Component

The MBIN component 1735 is a stored program component that is executed by a CPU. In one embodiment, the MBIN component incorporates any and/or all combinations of the aspects of the MBIN that was discussed in the previous figures. As such, the MBIN affects accessing, obtaining and the provision of information, services, transactions, and/or the like across various communications networks. The features and embodiments of the MBIN discussed herein increase network efficiency by reducing data transfer requirements the use of more efficient data structures and mechanisms for their transfer and storage. As a consequence, more data may be transferred in less time, and latencies with regard to data processing operations and transactions, are also reduced. In many cases, such reduction in storage, transfer time, bandwidth requirements, latencies, etc., will reduce the capacity and structural infrastructure requirements to support the MBIN's features and facilities, and in many cases reduce the costs, energy consumption/requirements, and extend the life of MBIN's underlying infrastructure; this has the added benefit of making the MBIN more reliable. Similarly, many of the features and mechanisms are designed to be easier for users to use and access, thereby broadening the audience that may enjoy/employ and exploit the feature sets of the MBIN; such ease of use also helps to increase the reliability of the MBIN. In addition, the feature sets include heightened security as noted via the Cryptographic components 1720, 1726, 1728 and throughout, making access to the features and data more reliable and secure.

The MBIN component may transform unencrypted objects, and/or the like, into secure bin enabled objects, and/or the like and use the MBIN. In one embodiment, the MBIN component 1735 takes inputs (e.g., create secure storage input 305, secure storage setup request 306, user secure object store login request 404, secure object store login request 405, bin creation input 605, bin creation request 608, bin object storage request 706, bin storage request 715, bin object retrieval request 905, bin object retrieval request 907, encrypted bin application setup definition 1006, bin application input 1009, and/or the like) etc., and transforms the inputs via various components (e.g., BDSES Component 1741, BSR Component 1742, and/or the like), into outputs (e.g., device linked API certificate 308, public key 310, API certificate and encrypted private key 407, encrypted binkey storage request 607, encrypted binkey and bin metadata 610, encrypted object storage response 717, encrypted object retrieval response 908, application bin object storage request 1011, bin application output 1014, and/or the like).

The MBIN component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery; jQuery UI; MooTools; Prototype; script.aculo.us; Simple Object Access Protocol (SOAP); SWFObject; Yahoo! User Interface; and/or the like), WebObjects, and/or the like. In one embodiment, the MBIN server employs a cryptographic server to encrypt and decrypt communications. The MBIN component may communicate to and/or with other components in a component collection, including itself, and/or facilities of the like. Most frequently, the MBIN component communicates with the MBIN database component 1719, operating system component 1715, other program components, and/or the like. The MBIN may contain, communicate, generate, obtain, and/or provide program component, system, user, and/or data communications, requests, and/or responses.

Distributed MBIN Components

The structure and/or operation of any of the MBIN node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the MBIN controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/ or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, Representational State Transfer (REST), process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. Further, the parsing grammar may be used beyond message parsing, but may also be used to parse: databases, data collections, data stores, structured data, and/or the like. Again, the desired configuration will depend upon the context, environment, and requirements of system deployment.

Additional embodiments of the MBIN may include:

1. A bin object datastore instantiation and encrypted bin object creation and synchronization apparatus, comprising:
  a memory; and
  a processor disposed in communication with said memory, and configured to issue a plurality of processing instructions stored in the memory, wherein the processor issues instructions to:
    receive, at a local user device, a request to establish a first bin object datastore;
    generate a bin object encryption key;
    encrypting the bin object encryption key a plurality of times using reversible public-private key-pair encryption to create a plurality of encrypted bin object encryption keys, wherein each encrypting of the bin object encryption key uses a different public key associated with at least one user device;
    store a first of the plurality of encrypted bin object encryption keys in a persistent storage area of the local user device;
    transmit the first of the plurality of encrypted bin object encryption keys to a bin object datastore synchronization server;
    transmit a second of the plurality of encrypted bin object encryption keys to the bin object datastore synchronization server for transmission to a second bin object datastore; and
    instantiate the first bin object datastore on the local user device, wherein the first bin object datastore is configured to bi-directionally synchronize with the second bin object datastore.

2. The apparatus of embodiment 1 wherein the first of the plurality of encrypted bin object encryption keys is created using a public key associated with the local user device and is associated with the first bin object datastore.

3. The apparatus of embodiment 1, wherein the second of the plurality of encrypted bin object encryption keys is created using a public key associated with a second user device and is associated with the second bin object datastore.

4. The apparatus of embodiment 1, additionally comprising instructions to:
  receive an unencrypted bin object for storage in the first bin object datastore and the second bin object datastore;
  retrieve the first of the plurality of encrypted bin object encryption keys from the persistent storage area of the local user device;
  decrypt the first of the plurality of encrypted bin object encryption keys to obtain the bin object encryption key;
  encrypt the unencrypted bin object using the bin object encryption key to create an encrypted bin object;
  store the encrypted bin object in the persistent storage area of the local user device; and
  transmit the encrypted bin object to the bin object datastore synchronization server, wherein the bin object datastore synchronization server is configured to further transmit the encrypted bin object to the second bin object datastore for storage.

5. The apparatus of embodiment 1 wherein the bin object encryption key is a key for a reversible block encryption.

6. The apparatus of embodiment 5 wherein the reversible block encryption is the Advanced Encryption Standard.

7. The apparatus of embodiment 1 wherein the reversible public-private key-pair encryption uses the RSA public-key cryptosystem.

8. The apparatus of embodiment 4 wherein the unencrypted bin object for storage is received from a bin application instantiated in connection with the first bin object datastore and running on the local user device.

9. The apparatus of embodiment 8 wherein the bin application is a secure encrypted messaging system.

10. The apparatus of embodiment 9 wherein the bin application is also instantiated in connection with the second bin object datastore and the secure encrypted messaging system provides message transport services via encrypted bin objects stored in either the first bin object datastore or the second bin object datastore and synchronized to the other bin object datastore.

11. The apparatus of embodiment 10 wherein the first bin object datastore and the second bin object datastore are comprised of a plurality of matched sub-bin object datastores, wherein each of the plurality of matched sub-bin object datastores uses a unique bin object encryption key.

12. The apparatus of embodiment 11 wherein a new sub-bin object datastore is added to the plurality of matched sub-bin object datastores at the direction of the bin application.

13. The apparatus of embodiment 12 wherein the bin application directs the addition of the new sub-bin object datastore when a message session for the secure encrypted messaging system has expired.

14. The apparatus of embodiment 13 wherein the message session expires upon one or more of the following:
the elapsing of a time quantum;
the transmission of a predetermined quantity of secure messages; and
the transmission of each secure message.

15. The apparatus of embodiment 8, wherein the first bin object datastore has a bin user interface visibility attribute settable by the bin application.

16. The apparatus of embodiment 15, wherein the bin user interface visibility attribute is equal to hidden.

17. The apparatus of embodiment 16, wherein the bin application defines an alternate user interface for interacting with the first bin object datastore.

18. The apparatus of embodiment 17, wherein the alternate user interface is in the form of a message send and receive user interface.

19. The apparatus of embodiment 17, wherein the alternate user interface is defined by a parseable definition file associated with the bin application and renderable in connection with the first bin object datastore.

20. The apparatus of embodiment 1, additionally comprising instructions to:
receive, at the local user device, from a user, a request to establish a bin object datastore zone including a user password and a plurality of user security question answers, wherein the bin object datastore zone can comprise one or more bin object datastores;
transmit from the local user device to the bin object datastore synchronization server a request to establish the bin object datastore zone;
receive, via a processor, a device-linked bin object datastore synchronization server API certificate configured to enable secure object transfers between the local user device and the bin object datastore synchronization server;
generate an encryption key pair comprising a public key and a private key;
encrypt the private key using information from the request to establish the bin object datastore persistence zone; and
transmit the public key and the encrypted private key to the bin object datastore synchronization server.

21. The apparatus of embodiment 20, wherein the information from the request to establish the bin object datastore zone is a password.

22. The apparatus of embodiment 20, wherein the information from the request to establish the bin object datastore zone is a plurality of security question answers.

23. The apparatus of embodiment 1 additionally comprising instructions to:
receive a bin template defining aspects of the first bin object datastore; and
use the bin template during instantiation of the first bin object datastore on the local user device.

24. The apparatus of embodiment 23, wherein the bin template includes a list of suggested unencrypted bin objects to store as encrypted bin objects in the first bin object datastore.

25. The apparatus of embodiment 23, wherein the bin template includes a guide for assisting the user in generating unencrypted bin objects.

26. The apparatus of embodiment 25, wherein the guide is configured to prompt a user to use a camera integrated into the local user device to capture the front and back of documents in a wallet.

27. The apparatus of embodiment 26, wherein the documents in the wallet comprise one or more of the following:
a driver's license;
a social security card;
a debit card;
a credit card; and
a student identification card.

28. The apparatus of embodiment 27, additionally comprising instructions to:
perform optical character recognition on the captured images of documents in the wallet; and
store a segment of the textual output of the optical character recognition in the first bin object datastore as a metadata encrypted bin object describing an encrypted bin object.

Additional embodiments of the MBIN may include:

1. A non-transitory medium storing bin object datastore instantiation and encrypted bin object creation and synchronization instructions to:
receive, at a local user device, a request to establish a first bin object datastore;
generate a bin object encryption key;
encrypting the bin object encryption key a plurality of times using reversible public-private key-pair encryption to create a plurality of encrypted bin object encryption keys, wherein each encrypting of the bin object encryption key uses a different public key associated with at least one user device;
store a first of the plurality of encrypted bin object encryption keys in a persistent storage area of the local user device;
transmit the first of the plurality of encrypted bin object encryption keys to a bin object datastore synchronization server;
transmit a second of the plurality of encrypted bin object encryption keys to the bin object datastore synchronization server for transmission to a second bin object datastore; and
instantiate the first bin object datastore on the local user device, wherein the first bin object datastore is configured to bi-directionally synchronize with the second bin object datastore.

2. The medium of embodiment 1 wherein the first of the plurality of encrypted bin object encryption keys is created using a public key associated with the local user device and is associated with the first bin object datastore.

3. The medium of embodiment 1, wherein the second of the plurality of encrypted bin object encryption keys is created using a public key associated with a second user device and is associated with the second bin object datastore.

4. The medium of embodiment 1, additionally comprising instructions to:
receive an unencrypted bin object for storage in the first bin object datastore and the second bin object datastore;
retrieve the first of the plurality of encrypted bin object encryption keys from the persistent storage area of the local user device;
decrypt the first of the plurality of encrypted bin object encryption keys to obtain the bin object encryption key;
encrypt the unencrypted bin object using the bin object encryption key to create an encrypted bin object;
store the encrypted bin object in the persistent storage area of the local user device; and
transmit the encrypted bin object to the bin object datastore synchronization server, wherein the bin object datastore synchronization server is configured to further transmit the encrypted bin object to the second bin object datastore for storage.

5. The medium of embodiment 1 wherein the bin object encryption key is a key for a reversible block encryption.

6. The medium of embodiment 5 wherein the reversible block encryption is the Advanced Encryption Standard.

7. The medium of embodiment 1 wherein the reversible public-private key-pair encryption uses the RSA public-key cryptosystem.

8. The medium of embodiment 4 wherein the unencrypted bin object for storage is received from a bin application instantiated in connection with the first bin object datastore and running on the local user device.

9. The medium of embodiment 8 wherein the bin application is a secure encrypted messaging system.

10. The medium of embodiment 9 wherein the bin application is also instantiated in connection with the second bin object datastore and the secure encrypted messaging system provides message transport services via encrypted bin objects stored in either the first bin object datastore or the second bin object datastore and synchronized to the other bin object datastore.

11. The medium of embodiment 10 wherein the first bin object datastore and the second bin object datastore are comprised of a plurality of matched sub-bin object datastores, wherein each of the plurality of matched sub-bin object datastores uses a unique bin object encryption key.

12. The medium of embodiment 11 wherein a new sub-bin object datastore is added to the plurality of matched sub-bin object datastores at the direction of the bin application.

13. The medium of embodiment 12 wherein the bin application directs the addition of the new sub-bin object datastore when a message session for the secure encrypted messaging system has expired.

14. The medium of embodiment 13 wherein the message session expires upon one or more of the following:
the elapsing of a time quantum;
the transmission of a predetermined quantity of secure messages; and
the transmission of each secure message.

15. The medium of embodiment 8, wherein the first bin object datastore has a bin user interface visibility attribute settable by the bin application.

16. The medium of embodiment 15, wherein the bin user interface visibility attribute is equal to hidden.

17. The medium of embodiment 16, wherein the bin application defines an alternate user interface for interacting with the first bin object datastore.

18. The medium of embodiment 17, wherein the alternate user interface is in the form of a message send and receive user interface.

19. The medium of embodiment 17, wherein the alternate user interface is defined by a parseable definition file associated with the bin application and renderable in connection with the first bin object datastore.

20. The medium of embodiment 1, additionally comprising instructions to:
receive, at the local user device, from a user, a request to establish a bin object datastore zone including a user password and a plurality of user security question answers, wherein the bin object datastore zone can comprise one or more bin object datastores;
transmit from the local user device to the bin object datastore synchronization server a request to establish the bin object datastore zone;
receive, via a processor, a device-linked bin object datastore synchronization server API certificate configured to enable secure object transfers between the local user device and the bin object datastore synchronization server;
generate an encryption key pair comprising a public key and a private key;
encrypt the private key using information from the request to establish the bin object datastore persistence zone; and
transmit the public key and the encrypted private key to the bin object datastore synchronization server.

21. The medium of embodiment 20, wherein the information from the request to establish the bin object datastore zone is a password.

22. The medium of embodiment 20, wherein the information from the request to establish the bin object datastore zone is a plurality of security question answers.

23. The medium of embodiment 1 additionally comprising instructions to:
receive a bin template defining aspects of the first bin object datastore; and
use the bin template during instantiation of the first bin object datastore on the local user device.

24. The medium of embodiment 23, wherein the bin template includes a list of suggested unencrypted bin objects to store as encrypted bin objects in the first bin object datastore.

25. The medium of embodiment 23, wherein the bin template includes a guide for assisting the user in generating unencrypted bin objects.

26. The medium of embodiment 25, wherein the guide is configured to prompt a user to use a camera integrated into the local user device to capture the front and back of documents in a wallet.

27. The medium of embodiment 26, wherein the documents in the wallet comprise one or more of the following:
a driver's license;
a social security card;
a debit card;
a credit card; and
a student identification card.

28. The medium of embodiment 27, additionally comprising instructions to:
perform optical character recognition on the captured images of documents in the wallet; and
store a segment of the textual output of the optical character recognition in the first bin object datastore as a metadata encrypted bin object describing an encrypted bin object.

Additional MBIN Configurations

In order to address various issues and advance the art, the entirety of this application for MBIN (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MBIN individual and/or enterprise user, database configuration and/or relational model, data type, data transmission and/or network framework, syntax structure, and/or the like, various embodiments of the MBIN, may be implemented that enable a great deal of flexibility and customization as described herein.

What is claimed is:

1. A processor-implemented bin object datastore instantiation and encrypted bin object creation and synchronization method, comprising:
    receiving, at a local user device, a request to establish a first bin object datastore;
    generating a bin object encryption key;
    encrypting the bin object encryption key a plurality of times using reversible public-private key-pair encryption to create a plurality of encrypted bin object encryption keys, wherein each encrypting of the bin object encryption key uses a different public key associated with at least one user device;
    storing a first of the plurality of encrypted bin object encryption keys in a persistent storage area of the local user device;
    transmitting the first of the plurality of encrypted bin object encryption keys to a bin object datastore synchronization server;
    transmitting a second of the plurality of encrypted bin object encryption keys to the bin object datastore synchronization server for transmission to a second bin object datastore;
    instantiating the first bin object datastore on the local user device, wherein the first bin object datastore is configured to bi-directionally synchronize with the second bin object datastore;
    additionally comprising:
        receiving, at the local user device, from a user, a request to establish a bin object datastore zone including a user password and a plurality of user security question answers, wherein the bin object datastore zone can comprise one or more bin object datastores;
        transmitting from the local user device to the bin object datastore synchronization server a request to establish the bin object datastore zone;
        receiving, via a processor, a device-linked bin object datastore synchronization server API certificate configured to enable secure object transfers between the local user device and the bin object datastore synchronization server;
        generating an encryption key pair comprising a public key and a private key;
        encrypting the private key using information from the request to establish the bin object datastore persistence zone; and transmitting the public key and the encrypted private key to the bin object datastore synchronization server.

2. The method of claim 1 wherein the first of the plurality of encrypted bin object encryption keys is created using a public key associated with the local user device and is associated with the first bin object datastore.

3. The method of claim 1, wherein the second of the plurality of encrypted bin object encryption keys is created using a public key associated with a second user device and is associated with the second bin object datastore.

4. The method of claim 1, additionally comprising:
    receiving an unencrypted bin object for storage in the first bin object datastore and the second bin object datastore;
    retrieving the first of the plurality of encrypted bin object encryption keys from the persistent storage area of the local user device;
    decrypting the first of the plurality of encrypted bin object encryption keys to obtain the bin object encryption key;
    encrypting the unencrypted bin object using the bin object encryption key to create an encrypted bin object;
    storing the encrypted bin object in the persistent storage area of the local user device; and
    transmitting the encrypted bin object to the bin object datastore synchronization server, wherein the bin object datastore synchronization server is configured to further transmit the encrypted bin object to the second bin object datastore for storage.

5. The method of claim 1 wherein the bin object encryption key is a key for a reversible block encryption.

6. The method of claim 5 wherein the reversible block encryption is the Advanced Encryption Standard.

7. The method of claim 1 wherein the reversible public-private key-pair encryption uses the RSA public-key cryptosystem.

8. The method of claim 4 wherein the unencrypted bin object for storage is received from a bin application instantiated in connection with the first bin object datastore and running on the local user device.

9. The method of claim 8 wherein the bin application is a secure encrypted messaging system.

10. The method of claim 9 wherein the bin application is also instantiated in connection with the second bin object datastore and the secure encrypted messaging system provides message transport services via encrypted bin objects stored in either the first bin object datastore or the second bin object datastore and synchronized to the other bin object datastore.

11. The method of claim 10 wherein the first bin object datastore and the second bin object datastore are comprised of a plurality of matched sub-bin object datastores, wherein each of the plurality of matched sub-bin object datastores uses a unique bin object encryption key.

12. The method of claim 11 wherein a new sub-bin object datastore is added to the plurality of matched sub-bin object datastores at the direction of the bin application.

13. The method of claim 12 wherein the bin application directs the addition of the new sub-bin object datastore when a message session for the secure encrypted messaging system has expired.

14. The method of claim 13 wherein the message session expires upon one or more of the following:
the elapsing of a time quantum;
the transmission of a predetermined quantity of secure messages; and
the transmission of each secure message.

15. The method of claim 8, wherein the first bin object datastore has a bin user interface visibility attribute settable by the bin application.

16. The method of claim 15, wherein the bin user interface visibility attribute is equal to hidden.

17. The method of claim 16, wherein the bin application defines an alternate user interface for interacting with the first bin object datastore.

18. The method of claim 17, wherein the alternate user interface is in the form of a message send and receive user interface.

19. The method of claim 17, wherein the alternate user interface is defined by a parseable definition file associated with the bin application and renderable in connection with the first bin object datastore.

20. The method of claim 1, wherein the information from the request to establish the bin object datastore zone is a password.

21. The method of claim 1, wherein the information from the request to establish the bin object datastore zone is a plurality of security question answers.

22. The method of claim 1 additionally comprising:
receiving a bin template defining aspects of the first bin object datastore; and
using the bin template during instantiation of the first bin object datastore on the local user device.

23. The method of claim 22, wherein the bin template includes a list of suggested unencrypted bin objects to store as encrypted bin objects in the first bin object datastore.

24. The method of claim 22, wherein the bin template includes a guide for assisting the user in generating unencrypted bin objects.

25. The method of claim 24, wherein the guide is configured to prompt a user to use a camera integrated into the local user device to capture the front and back of documents in a wallet.

26. The method of claim 25, wherein the documents in the wallet comprise one or more of the following:
a driver's license;
a social security card;
a debit card;
a credit card; and
a student identification card.

27. The method of claim 26, additionally comprising:
performing optical character recognition on the captured images of documents in the wallet; and
storing a segment of the textual output of the optical character recognition in the first bin object datastore as a metadata encrypted bin object describing an encrypted bin object.

* * * * *